US011964447B2

(12) United States Patent
Kikuchi et al.

(10) Patent No.: US 11,964,447 B2
(45) Date of Patent: Apr. 23, 2024

(54) LAMINATE

(71) Applicant: MITSUI CHEMICALS, INC., Tokyo (JP)

(72) Inventors: Yoshiharu Kikuchi, Ichihara (JP); Kotaro Ichino, Ichihara (JP)

(73) Assignee: Mitsui Chemicals, Inc. (JP)

( * ) Notice: Subject to any disclaimer, the term of this patent is extended or adjusted under 35 U.S.C. 154(b) by 421 days.

(21) Appl. No.: 16/486,817

(22) PCT Filed: Feb. 13, 2018

(86) PCT No.: PCT/JP2018/004906
§ 371 (c)(1),
(2) Date: Aug. 16, 2019

(87) PCT Pub. No.: WO2018/151103
PCT Pub. Date: Aug. 23, 2018

(65) Prior Publication Data
US 2020/0230910 A1 Jul. 23, 2020

(30) Foreign Application Priority Data

Feb. 20, 2017 (JP) ................................. 2017-028944

(51) Int. Cl.
B32B 1/08 (2006.01)
B32B 7/12 (2006.01)
B32B 25/04 (2006.01)
B32B 25/14 (2006.01)
B32B 37/12 (2006.01)
C08F 210/02 (2006.01)
C08L 23/08 (2006.01)
F16L 11/08 (2006.01)

(52) U.S. Cl.
CPC ................. B32B 1/08 (2013.01); B32B 7/12 (2013.01); B32B 25/042 (2013.01); B32B 25/14 (2013.01); B32B 37/12 (2013.01); C08F 210/02 (2013.01); C08L 23/083 (2013.01); F16L 11/08 (2013.01); B32B 2250/02 (2013.01); B32B 2319/00 (2013.01); B32B 2597/00 (2013.01)

(58) Field of Classification Search
CPC ...... C09J 151/06; C09J 123/08; C09J 131/00; F16L 11/04; F16L 11/045; F16L 11/047; F16L 11/08; F16L 11/081; F16L 11/082; F16L 11/083; F16L 11/085; F16L 11/086; F16L 11/087; F16L 11/088; F16L 11/10; B32B 58/04; B32B 58/042
USPC ...................... 428/36.91; 138/137
See application file for complete search history.

(56) References Cited

U.S. PATENT DOCUMENTS

| 3,886,234 A * | 5/1975 | Ishihara ..................... C09J 4/06 |
| | | 525/193 |
| 4,892,851 A | 1/1990 | Ewen et al. |
| 5,026,798 A | 6/1991 | Canich |
| 5,055,438 A | 10/1991 | Canich |
| 5,057,475 A | 10/1991 | Canich et al. |
| 5,096,867 A | 3/1992 | Canich |
| 5,153,157 A | 10/1992 | Hlatky et al. |
| 5,155,080 A | 10/1992 | Elder et al. |
| 5,158,920 A | 10/1992 | Razavi |
| 5,162,278 A | 11/1992 | Razavi |
| 5,198,401 A | 3/1993 | Turner et al. |
| 5,223,467 A | 6/1993 | Razavi |
| 5,223,468 A | 6/1993 | Razavi |
| 5,225,500 A | 7/1993 | Elder et al. |
| 5,227,440 A | 7/1993 | Canich et al. |
| 5,241,025 A | 8/1993 | Hlatky et al. |
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,292,838 A | 3/1994 | Razavi |
| 5,304,523 A | 4/1994 | Razavi |
| 5,321,106 A | 6/1994 | Lapointe |
| 5,334,677 A | 8/1994 | Razavi et al. |
| 5,384,299 A | 1/1995 | Turner et al. |
| 5,387,568 A | 2/1995 | Ewen et al. |

(Continued)

FOREIGN PATENT DOCUMENTS

| EP | 3 424 705 A1 | 1/2019 |
| EP | 3 584 074 A1 | 12/2019 |

(Continued)

OTHER PUBLICATIONS

US 5,168,111 A, 12/1992, Canich (withdrawn)
First Examination Report dated May 26, 2020 for corresponding Indian Patent Application No. 201917037417.
Hsieh and Randall, "Ethylene-1 Butene Copolymers. 1. Comonomer Sequence Distribution," Macromolecules, vol. 15, No. 2, Mar.-Apr. 1982, p. 353.

(Continued)

Primary Examiner — Lee E Sanderson
(74) Attorney, Agent, or Firm — Foley & Lardner LLP

(57) ABSTRACT

An object of the present invention is to provide a laminate of an olefin-type rubber, which is non-polar or has a small polarity and which is difficult to bond with a different material, and a rubber comprising Group 15 elements, which is a different kind of rubber. The laminate according to the present invention includes a structure including, in order, an olefin-type rubber layer (A); an adhesive resin layer (B) containing at least one selected from the group consisting of an ethylene/vinyl acetate copolymer, a silane-modified ethylene/vinyl acetate copolymer, an ethylene/acrylic acid copolymer and an ionomer thereof, and an ethylene/methacrylic acid copolymer and an ionomer thereof; and a layer (C) containing a rubber containing Group 15 elements.

8 Claims, No Drawings

(56) References Cited

U.S. PATENT DOCUMENTS

| | | |
|---|---|---|
| 5,391,629 A | 2/1995 | Turner et al. |
| 5,407,884 A | 4/1995 | Turner et al. |
| 5,408,017 A | 4/1995 | Turner et al. |
| 5,420,217 A | 5/1995 | Canich |
| 5,470,927 A | 11/1995 | Turner et al. |
| 5,483,014 A | 1/1996 | Turner et al. |
| 5,504,169 A | 4/1996 | Canich |
| 5,519,100 A | 5/1996 | Ewen et al. |
| 5,547,675 A | 8/1996 | Canich |
| 5,561,092 A | 10/1996 | Ewen et al. |
| 5,589,556 A | 12/1996 | Razavi |
| 5,599,761 A | 2/1997 | Turner |
| 5,604,033 A * | 2/1997 | Arthurs .................. B32B 15/04 428/350 |
| 5,614,457 A | 3/1997 | Ewen et al. |
| 5,621,126 A | 4/1997 | Canich et al. |
| 5,631,391 A | 5/1997 | Canich |
| 5,663,249 A | 9/1997 | Ewen et al. |
| 5,723,560 A | 3/1998 | Canich |
| 5,731,384 A * | 3/1998 | Chenard ................. C09J 123/08 525/326.5 |
| 5,763,549 A | 6/1998 | Elder et al. |
| 5,795,635 A * | 8/1998 | Iwasaki .................. B32B 25/10 428/521 |
| 5,801,113 A | 9/1998 | Jejelowo et al. |
| 5,807,939 A | 9/1998 | Elder et al. |
| 5,883,202 A | 3/1999 | Ewen et al. |
| 6,121,395 A | 9/2000 | Turner |
| 6,232,420 B1 | 5/2001 | Turner |
| 6,245,706 B1 | 6/2001 | Hlatky |
| 6,265,338 B1 | 7/2001 | Canich |
| 6,294,625 B1 | 9/2001 | Hlatky et al. |
| RE37,400 E | 10/2001 | Canich |
| 6,355,592 B1 | 3/2002 | Hlatky et al. |
| RE37,788 E | 7/2002 | Canich |
| 6,423,795 B1 | 7/2002 | Canich et al. |
| 6,617,466 B1 | 9/2003 | Canich |
| 6,632,898 B1 | 10/2003 | Canich |
| 6,838,141 B2 | 1/2005 | Ikemoto et al. |
| 7,041,841 B1 | 5/2006 | Canich |
| 7,163,907 B1 | 1/2007 | Canich et al. |
| RE40,234 E | 4/2008 | Canich |
| 7,569,646 B1 | 8/2009 | Canich |
| RE42,957 E | 11/2011 | Tohi et al. |
| 2003/0003317 A1 | 1/2003 | Chang et al. |
| 2003/0207118 A1 | 11/2003 | Fukushi |
| 2004/0219364 A1 | 11/2004 | Shirk et al. |
| 2005/0228155 A1 | 10/2005 | Kawai et al. |
| 2006/0161013 A1 | 7/2006 | Tohi et al. |
| 2006/0178491 A1 | 8/2006 | Canich |
| 2006/0270812 A1 | 11/2006 | Tohi et al. |
| 2007/0004854 A1 | 1/2007 | Wu et al. |
| 2007/0004855 A1 | 1/2007 | Wu et al. |
| 2007/0218233 A1 * | 9/2007 | Duke .................... F16L 11/081 428/36.91 |
| 2008/0220193 A1 | 9/2008 | Tohi et al. |
| 2010/0021665 A1 * | 1/2010 | Jackson ................ B32B 27/308 138/137 |
| 2016/0280819 A1 | 9/2016 | Tohi et al. |
| 2016/0355622 A1 | 12/2016 | Ichino et al. |

FOREIGN PATENT DOCUMENTS

| | | |
|---|---|---|
| JP | H01-501950 A | 7/1989 |
| JP | H01-502036 A | 7/1989 |
| JP | H03-179005 A | 8/1991 |
| JP | H03-179006 A | 8/1991 |
| JP | H03-207703 A | 9/1991 |
| JP | H03-207704 A | 9/1991 |
| JP | H05-41772 U | 6/1993 |
| JP | 2000-212194 A | 8/2000 |
| JP | 2003-251761 A | 9/2003 |
| JP | 2004-168744 A | 6/2004 |
| JP | 2004-175759 A | 6/2004 |
| JP | 2005-523181 A | 8/2005 |
| JP | 2009-500473 A | 1/2009 |
| JP | 2009-202603 A | 9/2009 |
| JP | 2009202603 A * | 9/2009 |
| JP | 2009-241348 A | 10/2009 |
| JP | 2013-221580 A | 10/2013 |
| JP | 2014-162823 A | 9/2014 |
| WO | WO-01/27124 A | 4/2001 |
| WO | WO-03/039858 A | 5/2003 |
| WO | WO-2005/100410 A | 10/2005 |
| WO | WO-2006/123759 A | 11/2006 |
| WO | WO-2015122415 A1 * | 8/2015 ............ C08F 210/18 |

OTHER PUBLICATIONS

Patsidis et al., "The Synthesis, Characterization and Polymerization Behavior of Ansa Cyclopentadienyl Fluorenyl Complexes; the X-ray Structures of the Complexes [(C13H8)SiR2(C5H4)]ZrCl2 (R=Me or Ph)," Journal of Organometallic Chemistry, vol. 509, No. 1, 1996, p. 63.

Ray et al., "Carbon-13 Nuclear Magnetic Resonance Determination of Monomer Composition and Sequence Distributions in Ethylene-Propylene Copolymers Prepared with a Stereoregular Catalyst System," Macromolecules, vol. 10, No. 4, Jul.-Aug. 1977, p. 773.

International Search Report dated May 22, 2018 for corresponding PCT/JP2018/004906 (5 pages).

Written Opinion dated May 22, 2018 for corresponding PCT/JP2018/004906 (11 pages).

* cited by examiner

LAMINATE

RELATED APPLICATIONS

The present application claims priority under 37 U.S.C. § 371 to International Patent Application No. PCT/JP2018/004906, filed Feb. 13, 2018, which claims priority to and the benefit of Japanese Patent Application No. 2017-028944, filed on Feb. 20, 2017. The contents of these applications are hereby incorporated by reference in their entireties.

TECHNICAL FIELD

The present invention relates to a laminate and more specifically a laminate of a polar rubber and a non-polar rubber.

BACKGROUND ART

Hoses for industrial use which are formed with rubbers are required to have various physical properties such as strength, flexibility, thermal resistance, bending resistance, and solvent resistance. It is difficult to satisfy all the required characteristics with one kind of rubber. For such reason, it is common to use rubbers having different properties in a stacked manner.

When different kinds of rubbers are stacked, a polar rubber may be directly bonded to a different rubber. However, it is common to bond a non-polar rubber via an adhesive layer.

Rubber hoses around an engine of an automobile are required to have high levels of heat aging resistance, fatigue resistance, and oil resistance. Conventionally, for example, fluorine rubber, an acrylonitrile/butadiene copolymer, acrylic rubber, an acrylic acid ester/ethylene copolymer, and silicone rubber are often used as a material of such a hose. In recent years, the temperature inside the engine room has been increased with the aim of improving performance and fuel economy in automobiles. Under such circumstances, it is necessary to further improve, for example, heat resistance and oil resistance of a rubber hose around an engine of an automobile. Here, fluorine rubber is preferable from the viewpoint of further improvement of heat resistance and oil resistance. However, fluorine rubber is expensive and there is a certain limit to its usage amount in terms of cost. Therefore, various types of research and development of laminates having a layer made of fluorine rubber and a layer made of non-fluorine rubber have been conventionally carried out.

One embodiment of such a laminate includes a laminate comprising an adhesive layer provided between a layer made of fluorine rubber and a layer made of non-fluorine rubber. As such a laminate, for example, Patent Document 1 discloses a laminate in which a polymer layer containing fluoropolymer and a base material are bonded via a bonding layer containing fluoroelastomer. Here, Patent Document 1 teaches that non-fluorinated elastomers such as acrylonitrile/butadiene rubber (NBR), chloroprene rubber, ethylene/propylene monomer (EPM) rubber, ethylene/propylene/diene monomer (EPDM) rubber, and epichlorohydrin (ECO) rubber may be used as a base material, in addition to an inorganic base material such as a metal or an inorganic glass and fluoropolymer.

Another embodiment includes a laminate formed by performing vulcanization bonding of a layer made of fluorine rubber and a layer made of non-fluorine rubber. For example, Patent Document 2 discloses a laminate formed by performing vulcanization bonding of a layer comprising fluorine rubber and a vulcanizing agent and a layer comprising non-fluorine rubber and a vulcanizing agent.

In recent years, engines for automobiles are increasingly downsized and equipped with a turbocharger for improving fuel efficiency. An engine with a turbocharger is configured so that air compressed by a compressor wheel is cooled by a charge air cooler and then sent to the engine, and the compressor wheel is connected to the charge air cooler by a rubber hose. This turbocharger hose is required to have high heat aging resistance because air at high pressure and high temperature (about 180° C.) flows therethrough. It is also required to have fatigue resistance to withstand continuous pressure oscillation caused by the passage of the air. In such an application, a material with high heat aging resistance such as acrylic rubber and silicone elastomer is currently adopted.

Meanwhile, nitrile rubber such as acrylonitrile/butadiene rubber which is excellent in oil resistance, has favorable wear resistance, and is relatively inexpensive. It is therefore widely used for applications requiring oil resistance such as fuel hoses, oil hoses, and oil seals. Hydrogenated nitrile rubber obtained by hydrogenating nitrile rubber may also be used for similar applications.

Patent Document 3 describes a composition containing an ethylene/alkyl acrylate copolymer and a cured product of the composition, which is a product of vulcanizate exhibiting improved impact fatigue resistance and heat resistance in comparison with conventional vulcanizates.

Patent Document 4 proposes a turbo hose including: an innermost rubber layer made of a fluorocarbon rubber and an envelope rubber layer made of a rubber such as silicone rubber, acrylic rubber, ethylene/acrylic rubber, epichlorohydrin rubber, and hydrogenated nitrile rubber, as that exhibiting excellent heat resistance and fatigue resistance and protecting the inner layer of tubes from cracking; and an engagement structure formed by engaging such a turbo hose to a tube engagement portion.

Meanwhile, it has been known that it is usually difficult to bond a shaped article of a non-polar rubber such as ethylene/propylene/diene rubber (EPDM) to a shaped article comprising a different material such as a metal or plastic or a shaped article of a rubber of the same type. Since EPDM is a non-polar rubber, a method of stacking layers via an adhesive layer has been common. For example, Patent Document 5 discloses that a rubber bonded body is obtained by providing a layer formed via crosslinking between a rubber shaped article and a shaped article comprising a rubber or a different material with a specific bonding agent comprising EPDM and a crosslinking agent. Patent Document 5 discloses in the Examples a bonded body obtained by bonding two EPDM sheets with an adhesive agent comprising EPDM and a crosslinking agent and performing crosslinking therebetween.

CITATION LIST

Patent Documents

Patent Document 1: JP 2005-523181 A
Patent Document 2: WO2003/039858 A
Patent Document 3: JP 2009-500473 A
Patent Document 4: JP 2013-221580 A
Patent Document 5: JP 2014-162823 A

SUMMARY OF INVENTION

Technical Problem

An object of the present invention is to provide a laminate of an olefin-type rubber, which is non-polar or has a small polarity and which is difficult to bond with a different material, and a rubber comprising Group 15 elements, which is a different kind of rubber.

Solution to Problem

As a result of intensive studies under such circumstances, the present inventors have found that it is possible to obtain a laminate in which an olefin-type rubber, which is non-polar or has a small polarity and which is difficult to bond with a different material, and a rubber comprising Group 15 elements, which is a different kind of rubber, are strongly integrated with the use of a specific adhesive resin. This has led to the completion of the present invention.

In other words, the present invention relates to the following [1] to [10].

[1] A laminate comprising a structure comprising, in order,
an olefin-type rubber layer (A);
an adhesive resin layer (B) containing at least one selected from the group consisting of an ethylene/vinyl acetate copolymer, a silane-modified ethylene/vinyl acetate copolymer, an ethylene/acrylic acid copolymer and an ionomer thereof, and an ethylene/methacrylic acid copolymer and an ionomer thereof; and
a layer (C) containing a rubber containing Group 15 elements.

[2] The laminate according to [1], wherein the adhesive resin layer (B) contains at least one selected from the group consisting of an ethylene/vinyl acetate copolymer and a silane-modified ethylene/vinyl acetate copolymer.

[3] The laminate according to [1] or [2], wherein the layer (C) contains a rubber containing nitrogen atoms.

[4] The laminate according to anyone of [1] to [3], wherein the layer (C) contains at least one selected from the group consisting of nitrile rubber, hydrogenated nitrile rubber, and urethane rubber.

[5] The laminate according to anyone of [1] to [3], wherein the layer (C) contains nitrile rubber.

[6] The laminate according to anyone of [1] to [5], wherein the olefin-type rubber layer (A) contains an ethylene/α-olefin/non-conjugated polyene copolymer.

[7] The laminate according to [6], wherein the ethylene/α-olefin/non-conjugated polyene copolymer has a structural unit derived from 5-vinyl-2-norbornene (VNB).

[8] A hose comprising the laminate according to any one of [1] to [7] as at least a part thereof.

[9] The hose according to [8], which is used in any one of applications for an automobile, a motorbike, industrial machinery, construction machinery, and agricultural machinery.

[10] A method of producing the laminate according to any one of [1] to [7], comprising a step of bonding the layer (A) and the layer (C) via the layer (B).

Advantageous Effects of Invention

The present invention can provide a laminate in which an olefin-type rubber, which is non-polar or has a small polarity and which is difficult to bond with a different material, and a rubber comprising Group 15 elements, which is a different kind of rubber, are strongly integrated via an adhesive resin layer comprising a specific adhesive resin.

DESCRIPTION OF EMBODIMENTS

[Laminate]

The laminate of the present invention comprises a structure comprising, in order,
an olefin-type rubber layer (A) (hereinafter referred to as "layer (A)" in some cases);
an adhesive resin layer (B) (hereinafter referred to as "layer (B)" in some cases); and
a layer (C) containing a rubber containing Group 15 elements (hereinafter referred to as "layer (C)" in some cases).

Hereinafter, the laminate of the present invention will be described in detail after describing each of polymers constituting the layers (A) to (C).

<Components in Each Layer>
Olefin-Type Rubber

The olefin-type rubber used in the present invention is a rubber containing a structural unit derived from olefin as its main structural unit. Examples of the olefin-type rubber include polyisobutylene, butyl rubber, and an ethylene/α-olefin-type copolymer rubber. Of these, a preferable example is an ethylene/α-olefin-type copolymer rubber.

Examples of the ethylene/α-olefin-type copolymer rubber include an ethylene/α-olefin copolymer rubber and an ethylene/α-olefin/non-conjugated diene copolymer rubber, and an ethylene/α-olefin/non-conjugated diene copolymer rubber is preferable. Here, the ethylene/α-olefin/non-conjugated polyene copolymer has structural units derived from ethylene, an α-olefin, and a non-conjugated polyene.

As the above-described α-olefin, an α-olefin having 3 to 20 carbon atoms is preferable. Examples of an α-olefin include, for example, propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene. Among them, α-olefins having 3 to 8 carbon atoms are preferable, such as propylene, 1-butene, 1-hexene, and 1-octene, and in particular, propylene is preferable. Such α-olefins are preferable because they are relatively inexpensive in raw material cost, and provide not only an ethylene/α-olefin/non-conjugated polyene copolymer excellent in mechanical properties but also a laminate exhibiting rubber elasticity.

These α-olefins may be used singly or in combination of two or more kinds.

Specific examples of a non-conjugated polyene include:
linear non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, and 4-ethylidene-1,7-undecadiene;

cyclic non-conjugated dienes such as unsaturated norbornene derivatives such as norbornadiene, 5-methylene-2-norbornene, 5-vinyl-2-norbornene (VNB), 5-isopropenyl-2-norbornene, 5-(2-propenyl)-2-norbornene, 5-isobutenyl-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2- norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-vinylidene-2-norbornene, 5-ethylidene-2-norbornene (ENB), and 5-isopropylidene-2-norbornene, methyltetrahydroindene, and dicyclopentadiene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nanodiene.

These non-conjugated polyenes may be used singly or in combination of two or more kinds.

Of these non-conjugated polyenes, VNB and ENB are preferable.

VNB is easily available and excellent in crosslinking reactivity with an organic peroxide during its crosslinking reaction after polymerization, enabling a laminate to have excellent thermal resistance and fatigue resistance. In other words, in one preferred embodiment of the present invention, an ethylene/α-olefin/non-conjugated polyene copolymer has a VNB-derived structural unit. A VNB-derived structural unit in the ethylene/α-olefin/non-conjugated polyene copolymer accounts for preferably from 0.07% to 10% by mass, more preferably from 0.1% to 8.0% by mass, and most preferably from 0.5% to 5.0% by mass with respect to 100% by mass of the ethylene/α-olefin/non-conjugated polyene copolymer.

ENB is easily available and excellent in crosslinking reactivity with sulfur or a vulcanization enhancer during its crosslinking reaction after polymerization, facilitating control of the crosslinking rate and achievement of favorable mechanical physical properties. In other words, in another preferred embodiment of the present invention, an ethylene/α-olefin/non-conjugated polyene copolymer has an ENB-derived structural unit. An ENB-derived structural unit in the ethylene/α-olefin/non-conjugated polyene copolymer accounts for preferably from 0.07% to 10% by mass, more preferably from 0.1% to 8.0% by mass, and most preferably from 0.5% to 5.0% by mass with respect to 100% by mass of the ethylene/α-olefin/non-conjugated polyene copolymer.

The ethylene/α-olefin/non-conjugated polyene copolymer satisfies preferably at least one of the following requirements (I) to (III), more preferably two of the following requirements (I) to (III), and particularly preferably the requirements (I) to (III).

Requirement (I): having a molar ratio of a structural unit derived from ethylene and a structural unit derived from an α-olefin (ethylene/α-olefin) of from 40/60 to 99.9/0.1.

Requirement (II): having a structural unit derived from a non-conjugated polyene in an amount of 0.07% to 10% by mass with respect to 100% by mass of the ethylene/α-olefin/non-conjugated polyene copolymer.

Requirement (III): having an intrinsic viscosity [η] measured in decalin at 135° C. of from 1.0 to 4.0 dl/g.

(Requirement (I))

Requirement (I) is to specify that the ethylene/α-olefin/non-conjugated polyene copolymer has a molar ratio of a structural unit derived from ethylene and a structural unit derived from an α-olefin (ethylene/α-olefin) of from 40/60 to 99.9/0.1.

The molar ratio of a structural unit derived from ethylene and a structural unit derived from an α-olefin (ethylene/α-olefin) is preferably from 55/45 to 85/15 and more preferably from 55/45 to 78/22.

When the ethylene/α-olefin ratio falls within the above range, a layer comprising a crosslinked article which is obtained by crosslinking the ethylene/α-olefin/non-conjugated polyene copolymer not only exhibits excellent rubber elasticity, but also is excellent in mechanical strength and flexibility, which is preferable. In addition, when the ethylene/α-olefin ratio falls within such a range, the ethylene/α-olefin/non-conjugated polyene copolymer not only exhibits excellent rubber elasticity, but also is excellent in mechanical strength and flexibility within the above range, which is preferable.

The molar ratio of a structural unit derived from ethylene and a structural unit derived from an α-olefin in the ethylene/α-olefin/non-conjugated polyene copolymer can be determined by using $^{13}$C-NMR.

(Requirement (II))

Requirement (II) is to specify that the ethylene/α-olefin/non-conjugated polyene copolymer has a structural unit derived from a non-conjugated polyene in an amount of 0.07% to 10% by mass with respect to 100% by mass of the ethylene/α-olefin/non-conjugated polyene copolymer.

The amount of a structural unit derived from a non-conjugated polyene accounts for preferably from 0.1% to 8.0% by mass and particularly preferably from 0.5% to 5.0% by mass. The ethylene/α-olefin/non-conjugated polyene copolymer having a structural unit derived from a non-conjugated polyene within the above range is preferable because it has sufficient hardness and excellent mechanical properties, and such ethylene/α-olefin/non-conjugated polyene copolymer is also preferable because it enables obtaining a crosslinked article having a large crosslinking density such that hardness of a layer comprising the crosslinked article can be improved.

The amount of a structural unit derived from a non-conjugated polyene can be determined by using $^{13}$C-NMR.

(Requirement (III))

Requirement (III) is to specify that an intrinsic viscosity [η] of the ethylene/α-olefin/non-conjugated polyene copolymer measured in decalin at 135° C. is from 1.0 to 4.0 dl/g.

The intrinsic viscosity [η] is more preferably from 1.5 to 4.0 dl/g. When the intrinsic viscosity is within the above range, a favorable balance between physical properties and processability is achieved, which is preferable.

Intrinsic viscosity can be measured by the method described in the Examples.

In addition, the ethylene/α-olefin/non-conjugated polyene copolymer preferably satisfies the following requirement (IV).

(Requirement (IV))

Requirement (IV) is to specify that a B value expressed by the following formula (i) for the ethylene/α-olefin/non-conjugated polyene copolymer is 1.20 or more.

$$B\text{value}=([EX]+2[Y])/[2\times[E]\times([X]+[Y])] \quad \text{(i)}$$

[where [E], [X], and [Y] represent molar fractions of ethylene, an α-olefin, and a non-conjugated polyene, respectively, and [EX] represents an ethylene-α-olefin diad chain fraction]

The B value is more preferably from 1.20 to 1.40 and particularly preferably from 1.20 to 1.25.

When the B value is within the above range, the ethylene/α-olefin/non-conjugated polyene copolymer has a low compression permanent set at low temperature, and thus, an excellent balance between rubber elasticity at low temperature and tensile strength at ordinary temperature is achieved, which is preferable.

In a case in which the B value of the ethylene/α-olefin/non-conjugated polyene copolymer is 1.20 or more, and the non-conjugated polyene is VNB, the laminate of the present invention tends to have particularly excellent fatigue resistance, which is preferable.

Note that the B value is an index showing random nature of copolymerized monomer sequence distribution in the copolymer, and [E], [X], [Y], and [EX] in the above formula (i) can be obtained by $^{13}$C-NMR spectral measurement based on the report of J. C. Randall [Macromolecules, 15, 353 (1982)], J. Ray [Macromolecules, 10, 773 (1977)], et al.

The amount of an α-olefin (content of a structural unit derived from an α-olefin) and the amount of a non-conjugated polyene (content of a structural unit derived from a non-conjugated polyene) in the ethylene/α-olefin/non-conjugated polyene copolymer can be determined by using $^{13}$C-NMR.

The ethylene/α-olefin/non-conjugated polyene copolymer has a structural unit derived from ethylene, a structural unit derived from an α-olefin, and a structural unit derived from a non-conjugated polyene as described above. However, it may have a structural unit derived from a different monomer (a monomer other than ethylene, an α-olefin, and a non-conjugated polyene) within a range unharmful to the effects of the present invention. A structural unit derived from such a different monomer accounts for preferably 30% by mass or less, more preferably 25% by mass or less, and particularly preferably 20% by mass or less of 100% by mass with respect to the ethylene/α-olefin/non-conjugated polyene copolymer. Examples of such a different monomer include styrene and vinyl acetate.

The ethylene/α-olefin/non-conjugated polyene copolymer also has a weight-average molecular weight (Mw) within the range of preferably from 10,000 to 600,000, more preferably from 30,000 to 500,000, and still more preferably from 50,000 to 400,000. The molecular weight distribution (Mw/Mn) of the ethylene/α-olefin/non-conjugated polyene copolymer is preferably from 1.8 to 30, more preferably from 1.8 to 25.0, still more preferably from 2.0 to 20.0. Mw and Mw/Mn can be obtained as a numerical value in terms of polystyrene measured by using gel permeation chromatography (GPC).

For example, in a case in which the laminate of the present invention is provided for an application of a heat-resistant hose such as a turbocharger hose for an automobile, an ethylene/α-olefin/non-conjugated polyene copolymer having a relatively high molecular weight can be suitably used, and specifically, an ethylene/α-olefin/non-conjugated polyene copolymer having a weight-average molecular weight (Mw) of 100,000 to 600,000 can be suitably used.

(Requirements (V-i) to (V-iii))

The ethylene/α-olefin/non-conjugated polyene copolymer preferably satisfies the following requirements (V-i) to (V-iii), in addition to the requirements (I) to (III) described above when the copolymer contains, as a non-conjugated polyene, a non-conjugated polyene including, in its molecule, two or more partial structures selected from the group consisting of the following formulae (I) and (II) (hereinafter referred to as "specific non-conjugated polyene").

(V-i) The weight average molecular weight (Mw) of the ethylene/α-olefin/non-conjugated polyene copolymer, the mass fraction of a structural unit derived from the specific non-conjugated polyene in the ethylene/α-olefin/non-conjugated polyene copolymer (mass fraction of the specific non-conjugated polyene (% by mass)), and the molecular weight of the specific non-conjugated polyene satisfy the following formula (1).

$$4.5 \leq Mw \times \text{Mass fraction of specific non-conjugated polyene}/100/\text{Molecular weight of specific non-conjugated polyene} \leq 40 \quad (1)$$

(V-ii) The ratio of complex viscosity η*(ω=0.1) (Pa·sec) at a frequency ω=0.1 rad/s and complex viscosity η*(ω=100) (Pa·sec) at a frequency ω=100 rad/s (η*(ω=0.1)/η*(ω=100)) obtained for the ethylene/α-olefin/non-conjugated polyene copolymer by linear viscoelasticity measurement using a rheometer (190° C.), the intrinsic viscosity [η] of the ethylene/α-olefin/non-conjugated polyene copolymer, and the mass fraction of a structural unit derived from the specific non-conjugated polyene in the ethylene/α-olefin/non-conjugated polyene copolymer (mass fraction of the specific non-conjugated polyene) satisfy the following formula (2).

$$P/([\eta]^{2.9}) \leq \text{Mass fraction of specific non-conjugated polyene} \times 6 \quad (2)$$

(V-iii) The number of long-chain branches per 1000 carbon atoms ($LCB_{1000C}$) in the ethylene/α-olefin/non-conjugated polyene copolymer obtained using 3D-GPC and the natural logarithm of the weight average molecular weight (Mw) of the ethylene/α-olefin/non-conjugated polyene copolymer [Ln (Mw)] satisfy the following formula (3).

$$LCB_{1000C} \leq 1 - 0.07 \times Ln(Mw) \quad (3)$$

[Chem. 21]

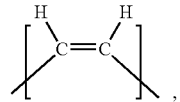

(I)

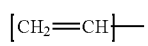

(II)

<<Requirement (V-i)>>

The requirement (V-i) is to identify that the weight average molecular weight (Mw) of the ethylene/α-olefin/non-conjugated polyene copolymer, the mass fraction of a structural unit derived from the specific non-conjugated polyene in the ethylene/α-olefin/non-conjugated polyene copolymer (mass fraction of the specific non-conjugated polyene: % by mass), and the molecular weight of the specific non-conjugated polyene (molecular weight of a specific non conjugated polyene) satisfy the formula (1) in the case for the above-described ethylene/α-olefin/non-conjugated polyene copolymer. The formula (1) in the requirement (V-i) is preferably the following formula (1').

$$4.5 \leq Mw \times \text{Mass fraction of specific non-conjugated polyene}/100/\text{Molecular weight of specific non-conjugated polyene} \leq 35 \quad (1')$$

When the ethylene/α-olefin/non-conjugated polyene copolymer satisfies the requirement (V-i), it is possible to produce a laminate, in which the content of a structural unit derived from the specific non-conjugated polyene is appropriate, and which exhibits sufficient crosslinking ability, is excellent in the crosslinking rate, and has excellent mechanical properties. The weight average molecular weight (Mw) of the ethylene/α-olefin/non-conjugated polyene copolymer can be obtained as a numerical value in terms of polystyrene measured by using gel permeation chromatography (GPC).

In the case of the ethylene/α-olefin/non-conjugated polyene copolymer, when "Mw×Mass fraction of specific non-conjugated polyene/100/Molecular weight of specific non-conjugated polyene" satisfies the above formula (1) or (1'), the degree of crosslinking becomes appropriate, making it possible to produce a laminate having an excellent balance between mechanical properties and heat aging resistance. When the value of "Mw×Mass fraction of specific non-conjugated polyene/100/Molecular weight of specific non-conjugated polyene" is excessively low, crosslinking performance may be insufficient, and thus, the crosslinking rate may be delayed. When the value is excessively high, crosslinking may occur to an excessive extent, and thus, mechanical properties may deteriorate.

<<Requirement (V-ii)>>

The requirement (V-ii) specifies that the ratio of complex viscosity $\eta^*(\omega=0.1)$ (Pa·sec) at a frequency $\omega=0.1$ rad/s and complex viscosity $\eta^*(\omega=100)$ (Pa·sec) at a frequency $\omega=100$ rad/s $P(\eta^*(\omega=0.1)/\eta^*(\omega=100))$ obtained by linear viscoelasticity measurement of the ethylene/α-olefin/non-conjugated polyene copolymer using a rheometer (190° C.), the intrinsic viscosity [η] of the ethylene/α-olefin/non-conjugated polyene copolymer, and the mass fraction of a structural unit derived from the specific non-conjugated polyene (mass fraction of the specific non-conjugated polyene: % by mass) satisfy the above formula (2). The formula (2) in the requirement (V-ii) is preferably the following formula (2').

$$P/([\eta]^{2.9}) \leq \text{Mass fraction of specific non-conjugated polyene} \times 5.7 \quad (2')$$

Here, the ratio of complex viscosity $\eta^*(\omega=0.1)$ at a frequency $\omega=0.1$ rad/s and complex viscosity $\eta^*(\omega=100)$ at a frequency $\omega=100$ rad/s $P(\eta^*(\omega=0.1)/\eta^*(\omega=100))$ indicates frequency dependency of viscosity. $P/([\eta]^{2.9})$ corresponding to the left side of the formula (2) tends to exhibit a high value when there are many long chain branches, although there is influence of short chain branches or molecular weight. In general, an ethylene/α-olefin/non-conjugated polyene copolymer tends to contain an increased number of long-chain branches as the number of structural units derived from the non-conjugated polyene increases. Meanwhile, it is considered that since the ethylene/α-olefin/non-conjugated polyene copolymer used in the present invention has less long chain branches than conventionally known ethylene/α-olefin/non-conjugated polyene copolymers, it can satisfy the above formula (2).

In the present invention, the P value is a ratio (η*ratio) calculated based on the complex viscosity at 0.1 rad/s and the complex viscosity at 100 rad/s obtained by measurement conducted at 190° C. and a strain of 1.0% under different frequency conditions using a viscoelasticity measuring instrument Ares (manufactured by Rheometric Scientific, Inc.). Note that intrinsic viscosity is a value measured in decalin at 135° C.

<<Requirement (V-iii)>>

The requirement (V-iii) specifies that the number of long-chain branches per 1000 carbon atoms ($LCB_{1000C}$) obtained using 3D-GPC and the natural logarithm of the weight average molecular weight (Mw) [Ln (Mw)] of the above-described ethylene/α-olefin/non-conjugated polyene copolymer satisfy the above formula (3). The formula (3) in the requirement (V-iii) is preferably the following formula (3').

$$LCB_{1000C} \leq 1 - 0.071 \times Ln(Mw) \quad (3')$$

The above formula (3) or (3') specifies the upper limit of the content of long-chain branches per unit number of carbon atoms in the ethylene/α-olefin/non-conjugated polyene copolymer.

When the ethylene/α-olefin/non-conjugated polyene copolymer satisfies the requirement (V-iii), it is possible to obtain a laminate having a small proportion of long-chain branches contained therein, excellent curing characteristics when crosslinking is performed using a peroxide, and excellent heat aging resistance.

Here, Mw and the number of long-chain branches per 1000 carbon atoms ($LCB_{1000C}$) can be obtained by a structural analysis method using 3D-GPC. Specifically, it was obtained herein as described below.

Absolute molecular weight distribution was determined using a 3D-high temperature GPC apparatus PL-GPC 220 (manufactured by Polymer Laboratories Ltd.), and at the same time, the intrinsic viscosity was determined using a viscometer. The main measurement conditions are as follows.

Detector: refractive index detector/built-in GPC device

Two-angle light scattering photometer PD 2040 (manufactured by Precision Detectors, Inc.)

Bridge viscometer PL-BV400 (manufactured by Polymer Laboratories Ltd.)

Column: TSKgel $GMH_{HR}$-H(S)HT×2 columns+TSKgel $GMH_{HR}$-M(S)×1 column (each column having an inner diameter of 7.8 mmφ×a length of 300 mm)

Temperature: 140° C.

Mobile phase: 1,2,4-trichlorobenzene (containing 0.025% of BHT)

Load quantity: 0.5 mL

Sample concentration: ca 1.5 mg/mL

Sample filtration: Filtration through a sintered filter having a pore size of 1.0 μm In the above, the dn/dc value required for determining the absolute molecular weight was determined for each sample based on a dn/dc value of 0.053 for a standard polystyrene (molecular weight of 190000) and the response intensity of the differential refractometer per unit injection mass.

From the relationship between the intrinsic viscosity obtained by the viscometer and the absolute molecular weight obtained by the light scattering photometer, the long chain branch parameter g'i for each eluted component was calculated from the following formula (v-1).

[Math 1]

$$g'i = \frac{[\eta]i, br}{[\eta]i, lin} \quad (v-1)$$

[η]i, br: Measured intrinsic viscosity of the i-th slice component

[η]i, lin: Intrinsic viscosity when assuming that the i-th slice component has no long chain branch structure and show only the short chain branch structure Here, the relational expression of $[\eta]=KM^v$; v=0.725 was applied.

Further, from the following formulae (v-2), (v-3), and (v-4), each average value was calculated as g'. Trendline, which was assumed to have only short chain branches, was determined for each sample.

[Math 2]

Number average long chain branch parameter $g'^n = \dfrac{\sum(C^i/M^i \times g'i)}{\sum(C^i/M^i)}$ (v-2)

Weight average long chain branch parameter $g'^w = \dfrac{\sum(C^i \times g'i)}{\sum C^i}$ (v-3)

z-average long chain branch parameter $g'^z = \dfrac{\sum(C^i \times M^{i2} \times g'i)}{\sum(C^i \times M^{i2})}$ (v-4)

$C^i$: Concentration per eluted component $M^i$: Absolute molecular weight for each eluted component Furthermore, the number of branch points per molecular chain (BrNo), the number of long-chain branches per 1000 carbon atoms (LCB$_{1000C}$), and the branch degree per unit molecular weight (A) were calculated using g'w. The following Zimm-Stockmayer formula (v-5) was used for calculation of BrNo, and the following formulae (v-6) and (v-7) were used for calculation of LCB$_{1000C}$ and λ, respectively. In the above, g is a long chain branch parameter determined from the inertia radius Rg, and the following simple correlation is made between g and g', the g' being obtained from the intrinsic viscosity. Various values of c in the formula have been proposed depending on the shape of the molecule. Here, calculation was made assuming that ε=1 (i.e., g'=g).

[Math 3]

$$g'^w = \dfrac{1}{\sqrt{\sqrt{1 + BrNo/7} + 4 \times BrNo/9\pi}}$$ (v-5)

λ=BrNo/M (v-6)

LCB$_{1000C}$=λ×14000 (v-7)

In the formula (v-7), "14000" corresponds to a molecular weight of 1,000 in methylene (CH$_2$) unit.

In the present invention, the specific non-conjugated polyene preferably contains VNB, and more preferably the specific non-conjugated polyene is VNB.

Method of Producing Olefin-Type Rubber

The method of producing the olefin-type rubber is not particularly limited, and it can be a conventionally known method.

Here, as described above, in a preferred embodiment of the present invention, since the olefin-type rubber is an ethylene/α-olefin/non-conjugated polyene copolymer, explanation will be made using this as an example.

Although the ethylene/α-olefin/non-conjugated polyene copolymer used in the present invention may be prepared by any production method, it is preferably a copolymer obtained by copolymerizing monomers in the presence of a metallocene compound, more preferably a copolymer obtained by copolymerizing monomers in the presence of a catalyst system containing a metallocene compound.

(Metallocene Compound)

The ethylene/α-olefin/non-conjugated polyene copolymer is desirably a copolymer obtained by copolymerizing monomers in the presence of at least one kind of metallocene compound selected from compounds represented by the following general formula [A1]. The copolymerization of monomers being carried out by using a catalyst system containing such a metallocene compound yields a copolymer containing suppressed long-chain branching, facilitating preparing the ethylene/α-olefin/non-conjugated polyene copolymer.

[Chem 1]

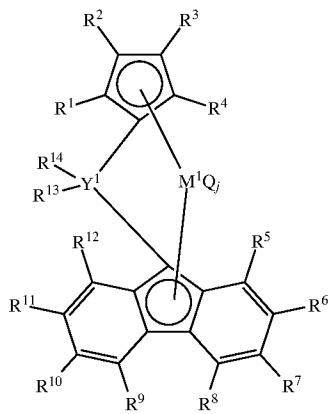

[A1]

In the above formula [A1], $R^1$, $R^2$, $R^3$, $R^4$, $R^5$, $R^8$, $R^9$, and $R^{12}$ are each independently a hydrogen atom, a hydrocarbon group, a silicon-containing group, or a heteroatom-containing group other than silicon-containing group, and among $R^1$ to $R^4$, adjacent two groups may together form a ring.

The hydrocarbon group is preferably a hydrocarbon group having 1 to 20 carbon atoms, and specific examples thereof include an alkyl group having 1 to 20 carbon atoms, an arylalkyl group having 7 to 20 carbon atoms, an aryl group or substituted aryl group having 6 to 20 carbon atoms, and the like. For example, they include methyl, ethyl, n-propyl, isopropyl, allyl, n-butyl, iso-butyl, sec-butyl, t-butyl, amyl, n-pentyl, neopentyl, n-hexyl, n-heptyl, n-octyl, n-nonyl, n-decanyl, 3-methylpentyl, 1,1-diethylpropyl, 1,1-dimethylbutyl, 1-methyl-1-propyl butyl, 1,1-dipropyl butyl, 1,1-dimethyl-2-methyl propyl, 1-methyl-1-isopropyl-2-methyl propyl, cyclopentyl, cyclohexyl, cycloheptyl, cyclooctyl, norbornyl, adamantyl, phenyl, o-tolyl, m-tolyl, p-tolyl, xylyl, isopropylphenyl, t-butylphenyl, naphthyl, biphenyl, terphenyl, phenanthryl, anthracenyl, benzyl, and cumyl groups.

The above hydrocarbon group may have a hydrogen atom substituted by a halogen atom, and examples thereof include trifluoromethyl, trifluoromethylphenyl, pentafluorophenyl, and chlorophenyl groups.

Examples of the silicon-containing group include silyl, siloxy, hydrocarbon-substituted silyl, and hydrocarbon-substituted siloxy groups. For example, they include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl, dimethyl(pentafluorophenyl)silyl groups, and the like.

Examples of the heteroatom-containing group other than silicon-containing group include: oxygen-containing groups such as methoxy, ethoxy, and phenoxy groups; nitrogen-containing groups such as nitro, cyano, N-methylamino, N,N-dimethylamino, and N-phenyl amino groups; boron-containing groups such as boranetriyl and diboranyl groups; and sulfur-containing groups such as sulfonyl and sulphenyl groups.

R⁶ and R¹¹ are the same atom or the same group selected from a hydrogen atom, a hydrocarbon group, a silicon-containing group, and a heteroatom-containing group other than silicon-containing group, R⁷ and R¹⁰ are the same atom or the same group selected from a hydrogen atom, a hydrocarbon group, a silicon-containing group, and a heteroatom-containing group other than silicon-containing group, R⁶ and R⁷ may together form a ring, and R¹⁰ and R¹¹ may together form a ring. However, not all of R⁶, R⁷, R¹⁰, and R¹¹ are hydrogen atoms simultaneously.

R¹³ and R¹⁴ each independently represent an aryl group.

M¹ represents a zirconium atom.

Y¹ represents a carbon atom or a silicon atom.

Q represents a halogen atom, a hydrocarbon group, a halogenated hydrocarbon group, a neutral conjugated or non-conjugated diene having 4 to 20 carbon atoms, an anionic ligand, or a neutral ligand coordinatable by a lone pair, and j represents an integer from 1 to 4, and when j is an integer of two or more a plurality of Qs may be the same or different from each other.

Examples of the halogen atom include a fluorine atom, a chlorine atom, a bromine atom, and an iodine atom, and the chlorine atom is preferable.

The hydrocarbon groups are preferably those having 1 to 10 carbon atoms, and specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, t-butyl, 1,1-dimethylbutyl, 1,1,3-trimethylbutyl, neo-pentyl, cyclohexylmethyl, cyclohexyl, 1-methyl-1-cyclohexyl, benzyl groups, and the like, and methyl, ethyl, and benzyl groups are preferable.

Halogenated hydrocarbon groups are preferably halogenated hydrocarbon groups having 1 to 10 carbon atoms. Specific examples thereof include trifluoromethyl, trifluoromethylphenyl, pentafluorophenyl, and chlorophenyl groups.

The neutral conjugated or non-conjugated diene having 4 to carbon atoms is preferably a neutral conjugated or non-conjugated diene having 4 to 10 carbon atoms. Specific examples of the neutral conjugated or non-conjugated diene include s-cis- or s-trams-η⁴-1,3-butadiene, s-cis- or s-trans-η⁴-1,4-diphenyl-1,3-butadiene, s-cis- or s-trans-η⁴-3-methyl-1,3-pentadiene, s-cis- or s-trans-η⁴-1,4-dibenzyl-1,3-butadiene, s-cis- or s-trans-η⁴-2,4-hexadiene, s-cis- or s-trans-η⁴-1,3-pentadiene, s-cis- or s-trans-η⁴-1,4-ditolyl-1,3-butadiene, s-cis- or s-trans-W-1,4-bis(trimethylsilyl)-1,3-butadiene, and the like.

Specific examples of the anionic ligand include alkoxy groups, such as methoxy, t-butoxy, andphenoxygroups, carboxylate groups, such as acetate and benzoate groups, and sulfonate groups, such as mesylate and tosylate groups, and the like.

Specific examples of the neutral ligand coordinatable by a lone pair include organic phosphorus compounds, such as trimethylphosphine, triethylphosphine, triphenylphosphine, and diphenylmethylphosphine, or ethers, such as tetrahydrofuran, diethyl ether, dioxane, and 1,2-dimethoxyethane.

Examples of the cyclopentadienyl group having substituents from R¹ to R⁴ in the formula [A1] include, but are not limited to, non-substituted cyclopentadienyl groups having substituents from R¹ to R⁴ which are hydrogen atoms, cyclopentadienyl groups monosubstituted at position 3, such as 3-t-butylcyclopentadienyl, 3-methylcyclopentadienyl, 3-trimethylsilylcyclopentadienyl, 3-phenylcyclopentadienyl, 3-adamantylcyclopentadienyl, 3-amylcyclopentadienyl, and 3-cyclohexylcyclopentadienyl groups, and cyclopentadienyl groups disubstituted at positions 3 and 5, such as 3-t-butyl-5-methylcyclopentadienyl, 3-t-butyl-5-ethylcyclopentadienyl, 3-phenyl-5-methylcyclopentadienyl, 3,5-di-t-butylcyclopentadienyl, 3,5-dimethylcyclopentadienyl, 3- and 3-trimethylsilyl-5-methylcyclopentadienyl groups. The non-substituted cyclopentadienyl groups (R¹ to R⁴ are hydrogen atoms) are preferable from the viewpoint of easiness to synthesize metallocene compounds, and their production cost and copolymerization ability for non-conjugated polyenes.

Examples of the fluorenyl group having the substituents from R⁵ to R¹² in the formula [A1] include, but are not limited to, fluorenyl groups monosubstituted at position 2, such as 2-methylfluorenyl, 2-t-butylfluorenyl, and 2-phenylfluorenyl groups, fluorenyl groups monosubstituted at position 4, such as 4-methylfluorenyl, 4-t-butylfluorenyl, and 4-phenylfluorenyl groups, and fluorenyl groups disubstituted at positions 2 and 7 or at positions 3 and 6, such as 2,7-di-t-butylfluorenyl, and 3,6-di-t-butylfluorenyl groups, fluorenyl groups tetrasubstituted at positions 2, 3, 6, and 7, such as 2,7-dimethyl-3,6-di-t-butylfluorenyl, and 2,7-diphenyl-3,6-di-t-butylfluorenyl groups, and fluorenyl groups tetrasubstituted at positions 2, 3, 6, and 7 in which R⁶ together with R⁷ and R¹⁰ together with R¹¹ each form a ring, as represented by the formulae [V-I] and [V-II].

[Chem. 2]

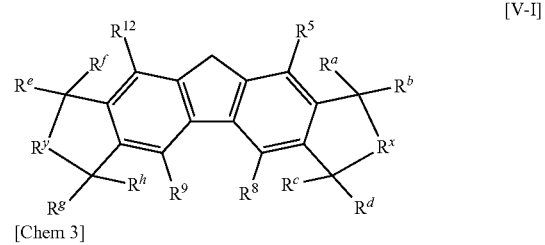

[V-I]

[Chem 3]

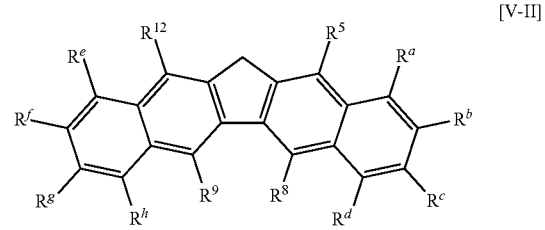

[V-II]

In the formulae [V-I] and [V-II], R⁵, R⁸, R⁹, and R¹² are the same as the definitions in the formula [A1], Rᵃ, Rᵇ, Rᶜ, Rᵈ, Rᵉ, Rᶠ, Rᵍ, and Rʰ are each independently a hydrogen atom or an alkyl group having 1 to 5 carbon atoms, and each may bond to an adjacent substituent to form together a ring. Specific examples of the alkyl groups include methyl, ethyl, n-propyl, isopropyl, n-butyl, t-butyl, amyl, and n-pentyl groups. In the formula [V-I], Rˣ and Rʸ are each independently a hydrocarbon group having 1 to 3 carbon atoms which may have an unsaturated bond, Rˣ may form a double-bond together with a carbon atom to which Rᵃ or Rᶜ bonds, Rʸ may form a double-bond together with a carbon atom to which Rᵉ or Rᵍ bonds, and Rˣ and Rʸ are both preferably a saturated or unsaturated hydrocarbon group having one or two carbon atoms.

Specific examples of the compounds represented by the formula [V-I] or [V-II] include octamethyloctahydrodibenzofluorenyl group represented by the formula [V-III], tetramethyldodecahydrodibenzofluorenyl group represented by the formula [V-IV], octamethyltetrahydrodicyclopentafluorenyl group represented by the formula [V-V], hexamethyldihydrodicyclopentafluorenyl group represented by the formula [V-VI], and b,h-dibenzofluorenyl group represented by the formula [V-VII].

[Chem. 4]

[V-III]

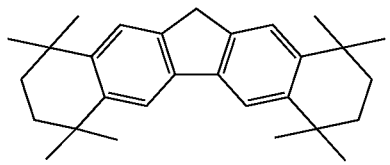

[Chem. 5]

[V-IV]

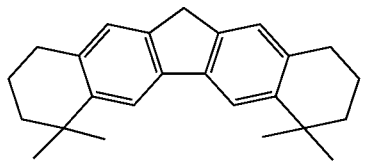

[Chem. 6]

[V-V]

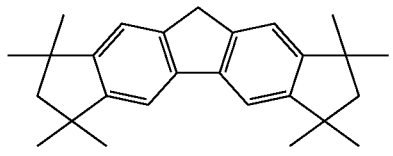

[Chem. 7]

[V-VI]

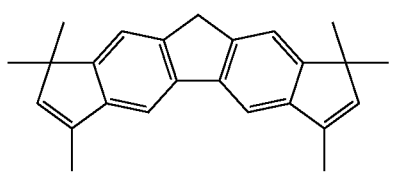

[Chem. 8]

[V-VII]

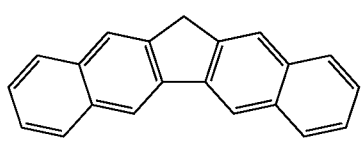

Any of the metallocene compounds represented by the general formula [A1] including these fluorenyl groups are excellent in copolymerization ability for non-conjugated polyene, and when $Y^1$ is a silicon atom, transition metal compounds are particularly excellent which have any of a fluorenyl group disubstituted at positions 2 and 7, a fluorenyl group disubstituted at positions 3 and 6, a fluorenyl group tetrasubstituted at positions 2, 3, 6, and 7, and a fluorenyl group tetrasubstituted at positions 2, 3, 6, and 7 represented by the above general formula [V-I]. When $Y^1$ is a carbon atom, metallocene compounds are particularly excellent which have any of a non-substituted fluorenyl group in which $R^5$ to $R^{12}$ are hydrogen atoms, a fluorenyl group disubstituted at positions 3 and 6, a fluorenyl group tetra- substituted at positions 2, 3, 6, and 7, and a fluorenyl group tetrasubstituted at position 2, 3, 6, and 7 represented by the above general formula [V-I].

In the present invention, in a metallocene compound represented by the general formula [A1], when $Y^1$ is a silicon atom, with all substituents from $R^5$ to $R^{12}$ being a hydrogen atom, $R^{13}$ and $R^{14}$ are preferably selected from groups other than methyl, butyl, phenyl, silicon-substituted phenyl, cyclohexyl, and benzyl groups;

when $Y^1$ is a silicon atom, with both $R^6$ and $R^{11}$ being t-butyl group, and $R^5$, $R^7$, $R^8$, $R^9$, $R^{10}$, and $R^{12}$ not being t-butyl group, $R^{13}$ and $R^{14}$ are preferably selected from groups other than benzyl group, and silicon-substituted phenyl group;

when $Y^1$ is a carbon atom, with all substituents from $R^5$ to $R^{12}$ being a hydrogen atom, $R^{13}$ and $R^{14}$ are preferably selected from groups other than methyl, isopropyl, t-butyl, isobutyl, phenyl, p-t-butylphenyl, p-n-butylphenyl, silicon-substituted phenyl, 4-biphenyl, p-tolyl, naphthyl, benzyl, cyclopentyl, cyclohexyl, and xylyl groups;

when $Y^1$ is a carbon atom, with $R^6$ and $R^{11}$ being the same group selected from t-butyl, methyl, and phenyl groups, and being a different group or atom from $R^5$, $R^7$, $R^8$, $R^9$, $R^{10}$, and $R^{12}$, $R^{13}$ and $R^{14}$ are preferably selected from groups other than methyl, phenyl, p-t-butylphenyl, p-n-butylphenyl, silicon-substituted phenyl, and benzyl groups;

when $Y^1$ is a carbon atom, with $R^6$ being dimethylamino, methoxy, or methyl group, and $R^5$, $R^7$, $R^8$, $R^9$, $R^{10}$, $R^{11}$, and $R^{12}$ being a different group or atom from $R^6$, $R^{13}$ and $R^{14}$ are preferably selected from groups other than methyl and phenyl groups; and when $Y^1$ is a carbon atom, with sites constituted by the fluorenyl group and substituents from $R^5$ to $R^{12}$ being b,h-dibenzofluorenyl or a,i-dibenzofluorenyl groups, $R^{13}$ and $R^{14}$ are preferably selected from groups other than methyl and phenyl groups.

Although specific examples of the metallocene compound represented by the formula [A1] in the present invention will be described below, the scope of the invention is not particularly limited thereby.

Specific examples of the metallocene compound represented by the formula [A1] in the invention include, when Y' is a silicon atom,
diphenylsilylene(cyclopentadienyl)(2,7-di-t-butylfluorenyl)zirconium dichloride,
diphenylsilylene(cyclopentadienyl)(3,6-di-t-butylfluorenyl)zirconium dichloride,
diphenylsilylene(cyclopentadienyl)(2,7-dimethyl-3,6-di-t-butylfluorenyl)zirconium dichloride,
diphenylsilylene(cyclopentadienyl)(2,7-diphenyl-3,6-di-t-butylfluorenyl)zirconium dichloride,
diphenylsilylene(cyclopentadienyl)(octamethyloctahydrodibenzofluorenyl)zirconium dichloride,
diphenylsilylene(cyclopentadienyl)(tetramethyldodecahydrodibenzofluorenyl)zirconium dichloride,
diphenylsilylene(cyclopentadienyl)(octamethyltetrahydrodicyclopentafluorenyl)zirconium dichloride,
diphenylsilylene(cyclopentadienyl)(hexamethyldihydrodicyclopentafluorenyl)zirconium dichloride,
diphenylsilylene(cyclopentadienyl)(b,h-dibenzofluorenyl)zirconium dichloride
di(p-tolyl)silylene(cyclopentadienyl)(fluorenyl)zirconium dichloride,
di(p-tolyl)silylene(cyclopentadienyl)(2,7-di-t-butylfluorenyl)zirconium dichloride, di(p-tolyl)silylene(cyclopentadienyl)(3,6-di-t-butylfluorenyl)zirconium dichloride,
di(p-tolyl)silylene(cyclopentadienyl)(2,7-dimethyl-3,6-di-t-butylfluorenyl)zirconium dichloride,
di(p-tolyl)silylene(cyclopentadienyl)(2,7-diphenyl-3,6-di-t-butylfluorenyl)zirconium dichloride,
di(p-tolyl)silylene(cyclopentadienyl)(octamethyloctahydrodibenzofluorenyl)zirconium dichloride,
di(p-tolyl)silylene(cyclopentadienyl)(tetramethyldodecahydrodibenzofluorenyl)zirconium dichloride,
di(p-tolyl)silylene(cyclopentadienyl)(octamethyltetrahydrodicyclopentafluorenyl)zirconium dichloride,
di(p-tolyl)silylene(cyclopentadienyl)(hexamethyldihydrodicyclopentafluorenyl)zirconium dichloride,
di(p-tolyl)silylene(cyclopentadienyl)(b,h-dibenzofluorenyl)zirconium dichloride,
di(m-tolyl)silylene(cyclopentadienyl)(fluorenyl)zirconium dichloride,
di(m-tolyl)silylene(cyclopentadienyl)(2,7-di-t-butylfluorenyl)zirconium dichloride,
di(m-tolyl)silylene(cyclopentadienyl)(3,6-di-t-butylfluorenyl)zirconium dichloride,
di(m-tolyl)silylene(cyclopentadienyl)(2,7-dimethyl-3,6-di-t-butylfluorenyl)zirconium dichloride,
di(m-tolyl)silylene(cyclopentadienyl)(2,7-diphenyl-3,6-di-t-butylfluorenyl)zirconium dichloride,
di(m-tolyl)silylene(cyclopentadienyl)(octamethyloctahydrodibenzofluorenyl)zirconium dichloride,
di(m-tolyl)silylene(cyclopentadienyl)(tetramethyldodecahydrodibenzofluorenyl)zirconium dichloride,
di(m-tolyl)silylene(cyclopentadienyl)(octamethyltetrahydrodicyclopentafluorenyl)zirconium dichloride,
di(m-tolyl)silylene(cyclopentadienyl)(hexamethyldihydrodicyclopentafluorenyl)zirconium dichloride,
di(m-tolyl)silylene(cyclopentadienyl)(b,h-dibenzofluorenyl)zirconium dichloride, and the like.

When $Y^1$ is a carbon atom, they include
diphenylmethylene(cyclopentadienyl)(3,6-di-t-butylfluorenyl)zirconium dichloride,
diphenylmethylene(cyclopentadienyl)(2,7-dimethyl-3,6-di-t-butylfluorenyl)zirconium dichloride,
diphenylmethylene(cyclopentadienyl)(2,7-diphenyl-3,6-di-t-butylfluorenyl)zirconium dichloride,
diphenylmethylene(cyclopentadienyl)(octamethyloctahydrodibenzofluorenyl)zirconium dichloride,
diphenylmethylene(cyclopentadienyl)(tetramethyldodecahydrodibenzofluorenyl)zirconium dichloride,
diphenylmethylene(cyclopentadienyl)(octamethyltetrahydrodicyclopentafluorenyl)zirconium dichloride,
diphenylmethylene(cyclopentadienyl)(hexamethyldihydrodicyclopentafluorenyl)zirconium dichloride,
diphenylmethylene(cyclopentadienyl)(b,h-dibenzofluorenyl)zirconium dichloride,
di(p-tolyl)methylene(cyclopentadienyl)(2,7-di-t-butylfluorenyl)zirconium dichloride,
di(p-tolyl)methylene(cyclopentadienyl)(3,6-di-t-butylfluorenyl)zirconium dichloride,
di(p-tolyl)methylene(cyclopentadienyl)(2,7-dimethyl-3,6-di-t-butylfluorenyl)zirconium dichloride,
di(p-tolyl)methylene(cyclopentadienyl)(2,7-diphenyl-3,6-di-t-butylfluorenyl)zirconium dichloride,
di(p-tolyl)methylene(cyclopentadienyl)(octamethyloctahydrodibenzofluorenyl)zirconium dichloride,
di(p-tolyl)methylene(cyclopentadienyl)(tetramethyldodecahydrodibenzofluorenyl)zirconium dichloride,
di(p-tolyl)methylene(cyclopentadienyl)(octamethyltetrahydrodicyclopentafluorenyl)zirconium dichloride,
di(p-tolyl)methylene(cyclopentadienyl)(hexamethyldihydrodicyclopentafluorenyl)zirconium dichloride,
di(p-tolyl)methylene(cyclopentadienyl)(b,h-dibenzofluorenyl)zirconium dichloride,
di(m-tolyl)methylene(cyclopentadienyl)(fluorenyl)zirconium dichloride,
di(m-tolyl)methylene(cyclopentadienyl)(2,7-di-t-butylfluorenyl)zirconium dichloride,
di(m-tolyl)methylene(cyclopentadienyl)(3,6-di-t-butylfluorenyl)zirconium dichloride,
di(m-tolyl)methylene(cyclopentadienyl)(2,7-dimethyl-3,6-di-t-butylfluorenyl)zirconium dichloride,
di(m-tolyl)methylene(cyclopentadienyl)(2,7-diphenyl-3,6-di-t-butylfluorenyl)zirconium dichloride,
di(m-tolyl)methylene(cyclopentadienyl)(octamethyloctahydrodibenzofluorenyl)zirconium dichloride,
di(m-tolyl)methylene(cyclopentadienyl)(tetramethyldodecahydrodibenzofluorenyl)zirconium dichloride,
di(m-tolyl)methylene(cyclopentadienyl)(octamethyltetrahydrodicyclopentafluorenyl)zirconium dichloride,
di(m-tolyl)methylene(cyclopentadienyl)(hexamethyldihydrodicyclopentafluorenyl)zirconium dichloride,
di(m-tolyl)methylene(cyclopentadienyl)(b,h-dibenzofluorenyl)zirconium dichloride,
di(p-t-butylphenyl)methylene(cyclopentadienyl)(3,6-di-t-butylfluorenyl)zirconium dichloride,
di(p-t-butylphenyl)methylene(cyclopentadienyl)(2,7-dimethyl-3,6-di-t-butylfluorenyl)zirconium dichloride,
di(p-t-butylphenyl)methylene(cyclopentadienyl)(2,7-diphenyl-3,6-di-t-butylfluorenyl)zirconium dichloride,
di(p-t-butylphenyl)methylene(cyclopentadienyl)(octamethyloctahydrodibenzofluorenyl)zirconium dichloride,
di(p-t-butylphenyl)methylene(cyclopentadienyl)(tetramethyldodecahydrodibenzofluorenyl)zirconium dichloride,
di(p-t-butylphenyl)methylene(cyclopentadienyl)(octamethyltetrahydrodicyclopentafluorenyl)zirconium dichloride,
di(p-t-butylphenyl)methylene(cyclopentadienyl)(hexamethyldihydrodicyclopentafluorenyl)zirconium dichloride,
di(p-t-butylphenyl)methylene(cyclopentadienyl)(b,h-dibenzofluorenyl)zirconium dichloride,
di(4-biphenyl)methylene(cyclopentadienyl)(2,7-di-t-butylfluorenyl)zirconium dichloride,
di(4-biphenyl)methylene(cyclopentadienyl)(3,6-di-t-butylfluorenyl)zirconium dichloride,
di(4-biphenyl)methylene(cyclopentadienyl)(2,7-dimethyl-3,6-di-t-butylfluorenyl)zirconium dichloride,
di(4-biphenyl)methylene(cyclopentadienyl)(2,7-diphenyl-3,6-di-t-butylfluorenyl)zirconium dichloride,
di(4-biphenyl)methylene(cyclopentadienyl)(octamethyloctahydrodibenzofluorenyl)zirconium dichloride,
di(4-biphenyl)methylene(cyclopentadienyl)(tetramethyldodecahydrodibenzofluorenyl)zirconium dichloride,
di(4-biphenyl)methylene(cyclopentadienyl)(octamethyltetrahydrodicyclopentafluorenyl)zirconium dichloride,
di(4-biphenyl)methylene(cyclopentadienyl)(hexamethyldihydrodicyclopentafluorenyl)zirconium dichloride,
di(4-biphenyl)methylene(cyclopentadienyl)(b,h-dibenzofluorenyl)zirconium dichloride,
di(p-chlorophenyl)methylene(cyclopentadienyl)(fluorenyl)zirconium dichloride,
di(p-chlorophenyl)methylene(cyclopentadienyl)(2,7-di-t-butylfluorenyl)zirconium dichloride, di(p-chlorophenyl)methylene(cyclopentadienyl)(3,6-di-t-butylfluorenyl)zirconium dichloride,
di(p-chlorophenyl)methylene(cyclopentadienyl)(2,7-dimethyl-3,6-di-t-butylfluorenyl)zirconium dichloride,
di(p-chlorophenyl)methylene(cyclopentadienyl)(2,7-diphenyl-3,6-di-t-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(tetramethyldodecahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(hexamethyldihydrodicyclopentafluorenyl)zirconium dichloride,
di(p-chlorophenyl)methylene(cyclopentadienyl)(b,h-dibenzofluorenyl)zirconium dichloride,
di(m-chlorophenyl)methylene(cyclopentadienyl)(fluorenyl)zirconium dichloride,
di(m-chlorophenyl)methylene(cyclopentadienyl)(2,7-di-t-butylfluorenyl)zirconium dichloride,
di(m-chlorophenyl)methylene(cyclopentadienyl)(3,6-di-t-butylfluorenyl)zirconium dichloride,
di(m-chlorophenyl)methylene(cyclopentadienyl)(2,7-dimethyl-3,6-di-t-butylfluorenyl)zirconium dichloride,
di(m-chlorophenyl)methylene(cyclopentadienyl)(2,7-diphenyl-3,6-di-t-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(tetramethyldodecahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(hexamethyldihydrodicyclopentafluorenyl)zirconium dichloride,
di(m-chlorophenyl)methylene(cyclopentadienyl)(b,h-dibenzofluorenyl)zirconium dichloride,
di(m-trifluoromethylphenyl)methylene(cyclopentadienyl)(fluorenyl)zirconium dichloride,
di(m-trifluoromethylphenyl)methylene(cyclopentadienyl)(2,7-di-t-butylfluorenyl)zirconium dichloride,
di(m-trifluoromethylphenyl)methylene(cyclopentadienyl)(3,6-di-t-butylfluorenyl)zirconium dichloride,
di(m-trifluoromethylphenyl)methylene(cyclopentadienyl)(2,7-dimethyl-3,6-di-t-butylfluorenyl)zirconium dichloride,
di(m-trifluoromethylphenyl)methylene(cyclopentadienyl)(2,7-diphenyl-3,6-di-t-butylfluorenyl)zirconium dichloride,
di(m-trifluoromethylphenyl)methylene(cyclopentadienyl)(octamethyloctahydrodibenzofluorenyl)zirconium dichloride,
di(m-trifluoromethylphenyl)methylene(cyclopentadienyl)(tetramethyldodecahydrodibenzofluorenyl)zirconium dichloride,
di(m-trifluoromethylphenyl)methylene(cyclopentadienyl)(octamethyltetrahydrodicyclopentafluorenyl)zirconium dichloride,
di(m-trifluoromethylphenyl)methylene(cyclopentadienyl)(hexamethyldihydrodicyclopentafluorenyl)zirconium dichloride,
di(m-trifluoromethylphenyl)methylene(cyclopentadienyl)(b,h-dibenzofluorenyl)zirconium dichloride,
di(2-naphthyl)methylene(cyclopentadienyl)(2,7-di-t-butylfluorenyl)zirconium dichloride,
di(2-naphthyl)methylene(cyclopentadienyl)(3,6-di-t-butylfluorenyl)zirconium dichloride,
di(2-naphthyl)methylene(cyclopentadienyl)(2,7-dimethyl-3,6-di-t-butylfluorenyl)zirconium dichloride,
di(2-naphthyl)methylene(cyclopentadienyl)(2,7-diphenyl-3,6-di-t-butylfluorenyl)zirconium dichloride,
di(2-naphthyl)methylene(cyclopentadienyl)(octamethyloctahydrodibenzofluorenyl)zirconium dichloride,
di(2-naphthyl)methylene(cyclopentadienyl)(tetramethyldodecahydrodibenzofluorenyl)zirconium dichloride,
di(2-naphthyl)methylene(cyclopentadienyl)(octamethyltetrahydrodicyclopentafluorenyl)zirconium dichloride,
di(2-naphthyl)methylene(cyclopentadienyl)(hexamethyldihydrodicyclopentafluorenyl)zirconium dichloride,
di(2-naphthyl)methylene(cyclopentadienyl)(b,h-dibenzofluorenyl)zirconium dichloride, and the like.

As examples of structural formulae of these metallocene compounds, structural formulae of di(p-tolyl)methylene(cyclopentadienyl) (octamethyloctahydrodibenzofluorenyl)zirconium dichloride (in the following formula (A1-1)) and di(p-chlorophenyl)methylene(cyclopentadienyl) (octamethyloctahydrodibenzofluorenyl)zirconium dichloride (in the following formula (A1-2)) are shown below.

[Chem 9]

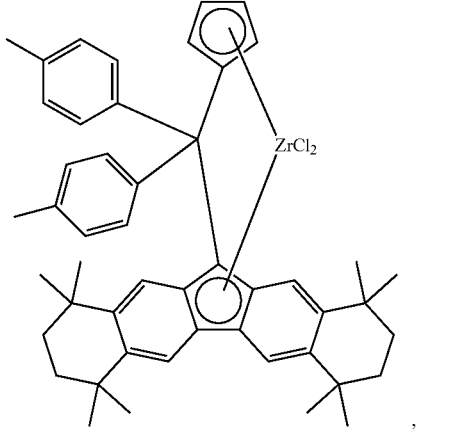

(A1-1)

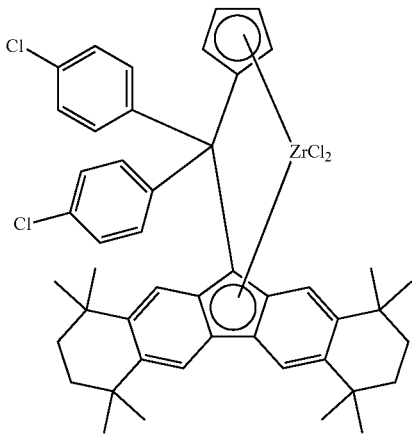

(A1-2)

The above compounds may be used singly or in combination of two or more kinds.

The metallocene compound represented by the formula [A1] which can be suitably used for preparing the ethylene/α-olefin/non-conjugated polyene copolymer of the invention can be produced by any method without any special limitation. Specifically, it can be produced, for example, in accordance with methods described in J. Organomet. Chem., 63, 509(1996), and WO 2005/100410, WO 2006/123759, WO 01/27124, JP 2004-168744 A, JP 2004-175759 A, and JP 2000-212194 A, which are documents according to the applications by the present applicants.

(Catalyst Containing Metallocene Compound)

Examples of polymerization catalysts which can be suitably used for producing the ethylene/α-olefin/non-conjugated polyene copolymer of the present invention include catalysts which contain the metallocene compound represented by the aforementioned formula [A1] and are capable of copolymerizing monomers.

Preferably, they include catalysts composed of:
(a) a metallocene compound represented by the aforementioned formula [A1];
(b) at least one compound selected from (b-1) an organometallic compound, (b-2) an organoaluminum oxy-compound, and (b-3) a compound reacting with the metallocene compound (a) to form an ion pair; and as necessary,
(c) a particulate carrier.

Each of the components will be specifically explained below.

((b-1) Organometallic Compound)

The organometallic compound (b-1) to be used in the present invention is specifically an organometallic compound of Groups 1, 2 and 12, 13 represented by the following general formulae from [VII] to [IX].

(b-1a) Organoaluminum Compound Represented by a General Formula of $R^a{}_m Al(OR^b)_n H_p X_q$ [VII]

(In the formula [VII], $R^a$ and $R^b$ may be the same or different from each other, and represent a hydrocarbon group having 1 to 15 carbon atoms, and preferably 1 to 4 carbon atoms, X represents a halogen atom, m is a number of 0<m 3, n is a number of 0 n<3, p is a number of 0≤p<3, q is a number of 0≤q<3, and m+n+p+q=3.)

Examples of such compounds can include trialkylaluminums, such as trimethylaluminum, triethylaluminum, triisobutylaluminum, and tri-n-octylaluminum, tricycloalkylaluminums, isobutylaluminum dichloride, diethylaluminum chloride, ethylaluminum dichloride, ethylaluminum sesquichloride, methylaluminum dichloride, dimethylaluminum chloride, and diisobutylaluminum hydride.

(b-1b) Complex Alkylated Product of Group 1 Metal and Aluminum, Represented by a General Formula of $M^2 AlR^a{}_4$ [VIII]

(In the formula [VIII], $M^2$ represents Li, Na, or K, $R^a$ is a hydrocarbon group having 1 to 15 carbon atoms, and preferably 1 to 4 carbon atoms.)

Examples of such compounds can include $LiAl(C_2H_5)_4$, $LiAl(C_7H_{15})_4$, and the like.

(b-1c) Dialkyl Compound Having Group 2 or 12 Metal, Represented by a General Formula of $R^a R^b M^3$ [IX]

(In the formula [IX], $R^a$ and $R^b$ may be the same or different from each other, and represent a hydrocarbon group having 1 to 15 carbon atoms, and preferably 1 to 4 carbon atoms, and $M^3$ is Mg, Zn, or Cd.)

Among the above organometallic compounds (b-1), organoaluminum compounds, such as triethylaluminum, triisobutylaluminum, and tri-n-octylaluminum are preferable.

Such organometallic compounds (b-1) can be used singly or in combination with two or more kinds.

((b-2) Organoaluminum Oxy-Compound)

Organoaluminum oxycompounds (b-2) to be used in the invention may be conventionally well-known aluminoxanes, or organoaluminum oxycompounds insoluble into benzene as described in JP H2-78687 A.

Conventionally known aluminoxanes can be produced, for example, by the following methods, and usually obtained as a solution with a hydrocarbon solvent.

(1) A method in which an organoaluminum compound such as a trialkylaluminum is added to a hydrocarbon solution suspending a compound containing adsorbed water or a salt containing crystallization water, such as magnesium chloride hydrate, copper sulfate hydrate, aluminum sulfate hydrate, nickel sulfate hydrate, and cerous chloride hydrate, to make the adsorbed water or the crystallization water react with the organoaluminum compound.

(2) A method in which water, ice, or water vapor is directly applied to an organoaluminum compound such as a trialkylaluminum in a medium such as benzene, toluene, ethyl ether, and tetrahydrofuran.

(3) A method in which an organo-tin oxide such as dimethyltin oxide and dibutyltin oxide is made react with an organoaluminum compound such as a trialkylaluminum in a medium, such as decane, benzene, and toluene.

The aluminoxanes may contain a small amount of an organic metal component. Furthermore, aluminoxane in the above recovered aluminoxane solution may be separated by distillation from the solvent or the non-reacted organoaluminum compound, to be dissolved again into a solvent or suspended into a poor solvent for aluminoxane.

Specific examples of organoaluminum compounds used for preparing the aluminoxane include those which are the same as organoaluminum compounds exemplified by (b-1a).

Among them, trialkylaluminums and tricycloalkylaluminums are preferable, and trimethylaluminum and triisobutylaluminum are particularly preferable.

The organoaluminum compounds as described above can be used singly or in combination of two or more kinds.

A benzene-insoluble organoaluminum oxycompound which is one aspect of the organoaluminum oxycompound (b-2) used in the present invention is preferably a compound in which the Al component soluble into benzene at 60° C. is usually 10% or less by mass in terms of Al atom with respect to 100% by mass of benzene, preferably 5% or less by mass, and especially preferably 2% or less by mass, and in other words, the organoaluminum oxycompounds are preferably insoluble or poorly soluble into benzene.

Examples of the organoaluminum oxycompound (b-2) to be used in the invention can include those which contain boron and are represented by the following general formula [X]

[Chem 10]

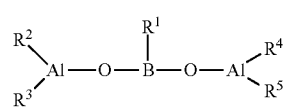

[In the formula [X], $R^1$ represents a hydrocarbon group having 1 to 10 carbon atoms, and substituents from $R^2$ to $R^5$ may be the same or different from each other and represent a hydrogen atom, a halogen atom, or a hydrocarbon group having 1 to 10 carbon atoms.]

Organoaluminum oxy compounds containing boron, represented by the above formula [X] can be produced by reacting alkylboronic acid represented by the following formula [XI], with an organoaluminum compound in an inert solvent under an inert gas atmosphere at a temperature in a range of from −80° C. to room temperature for 1 minute to 24 hours.

$R^1$—B(OH)$_2$      [XI]

(In the formula [XI], $R^1$ represents the same group as $R^1$ in the above formula [X].)

Specific examples of the alkylboronic acid represented by the above general formula [XI] include methylboronic acid, ethylboronic acid, isopropylboronic acid, n-propylboronic acid, n-butylboronic acid, isobutylboronic acid, n-hexyl boronic acid, cyclohexylboronic acid, phenylboronic acid, 3,5-difluorophenylboronic acid, pentafluorophenylboronic acid, and 3,5-bis(trifluoromethyl)phenylboronic acid, and the like.

Among them, methylboronic acid, n-butylboronic acid, isobutylboronic acid, 3,5-difluorophenylboronic acid, and pentafluorophenylboronic acid are preferable. These are used singly or in combination of two or more kinds.

Specific examples of organoaluminum compounds to be reacted with these alkylboronic acids include those which are the same as an organoaluminum compound exemplified by the above compound represented by (b-1a).

Among them, trialkylaluminums and tricycloalkylaluminums are preferable, and trimethylaluminum, triethylaluminum, and triisobutylaluminum are particularly preferable. These are used singly or in combination with two or more kinds. The above organoaluminum oxycompound (b-2) is used singly or in combination with two or more kinds.

((b-3) Compound to be Reacted with Transition Metal Compound (A) to Form an Ion Pair)

Examples of the compound (b-3) to be reacted with a crosslinkedmetallocene compound (A) used in the present invention, to form an ion pair (hereinafter referred to as "ionized ionic compounds") includes Lewis acids, ionic compounds, borane compounds, and carborane compounds described in, for example, JP H1-501950 A, JP H1-502036 A, JP H3-179005 A, JP H3-179006 A, JP H3-207703 A, JP H3-207704 A, USP-5321106, and the like. Further, they can include heteropolycompounds and isopolycompounds. The ionized ionic compound (b-3) is used singly or in combination with two or more kinds.

Specific examples of the Lewis acids includes compounds represented by BR$_3$ (R is fluorine or a phenyl group which may have a substituent, such as fluorine, methyl, and trifluoromethyl groups), and includes, for example, trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, and tris(3,5-dimethylphenyl)boron.

Examples of the ionic compound include, for example, compounds represented by following general formula [XII],

[Chem 11]

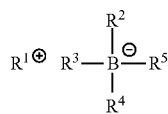

[XII]

(In the formula [XII], examples of $R^{1+}$ include $H^+$, carbonium cations, oxonium cations, ammonium cations, phosphonium cations, cycloheptyltrienyl cations, and ferrocenium cations having a transition metal. Substituents from $R^2$ to $R^5$ may be the same or different from each other, and are an organic group, preferably an aryl or substituted aryl group.)

Specific examples of the carbonium cation include trisubstituted carbonium cations such as triphenyl carbonium cation, tri(methylphenyl)carbonium cation, tri(dimethylphenyl)carbonium cation, and the like.

Specific examples of the ammonium cations include trialkylammonium cations, such as trimethylammonium cation, triethylammonium cation, tripropylammonium cation, tributylammonium cation, and tri(n-butyl)ammonium cation;

N,N-dialkylanilinium cations, such as N,N-dimethylanilinium cation, N,N-diethylanilinium cation, and N,N,2,4,6-pentamethylanilinium cation; and dialkylammonium cations, such as di(isopropyl)ammonium cation and dicyclohexyl ammonium cation.

Specific examples of the phosphonium cation include triarylphosphonium cations, such as triphenylphosphonium cation, tri(methylphenyl)phosphonium cation, and tri(dimethylphenyl)phosphonium cation.

Examples of $R^{1+}$ are preferably carbonium cations or ammonium cations, and triphenylcarbonium cation, N,N-dimethylanilinium cation, and N,N-diethylanilinium cation are particularly preferable.

Examples of the ionic compound can also include, for example, trialkyl-substituted ammonium salts, N,N-dialkylanilinium salts, dialkylammonium salts, and triarylphosphonium salts.

Specific examples of the trialkyl-substituted ammonium salts include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tri(n-butyl)ammonium tetra(pentafluorophenyl)boron, tripropylammonium tetra(o,p-dimethylphenyl)boron, tri(n-butyl)ammonium tetra(N,N-dimethylphenyl)boron, tri(n-butyl)ammonium tetra(p-trifluoromethylphenyl)boron, tri(n-butyl)ammonium tetra(3,5-ditrifluoromethylphenyl)boron, tri(n-butyl)ammonium tetra(o-tolyl)boron, and the like.

Specific examples of the N,N-dialkylanilinium salts include N,N-dimethylaniliniumtetra(phenyl)boron, N,N-diethylanilinium tetra(phenyl)boron, N,N,2,4,6-pentamethylanilinium tetra(phenyl)boron, and the like.

Specific examples of the dialkylammonium salts include di(1-propyl)ammonium tetra(pentafluorophenyl)boron, dicyclohexylammonium tetra(phenyl)boron, and the like.

Examples of the ionic compounds also can include triphenylcarbenium tetrakis(pentafluorophenyl)borate, N,N-dimethylanilinium tetrakis(pentafluorophenyl)borate, ferroceniumtetra(pentafluorophenyl)borate, triphenylcarbenium pentaphenylcyclopentadienyl complex, N,N-diethylanilinium pentaphenylcyclopentadienyl complex, boron compounds represented by the following general formula [XIII] or [XIV], and the like. In the formulae, Et represents an ethyl group.

[Chem. 12]

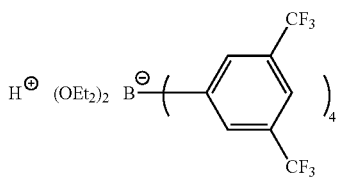

[XIII]

[Chem 13]

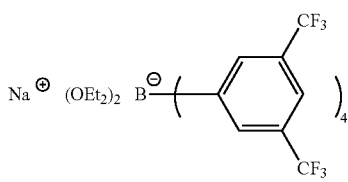

[XIV]

Specific examples of the borane compounds include: decaborane; anionic salts, such as bis[tri(n-butyl)ammonium]nonaborate, bis[tri(n-butyl)ammonium]decaborate, bis[tri(n-butyl)ammonium]undecaborate, bis[tri(n-butyl) ammonium]dodecaborate, bis[tri(n-butyl)ammonium]decachlorodecaborate, and bis[tri(n-butyl)ammonium]dodecachlorododecaborate; salts of metal borane anion, such as tri(n-butyl)ammonium bis(dodecahydridododecaborate)cobaltate (III), bis[tri(n-butyl)ammonium]bis(dodecahydridododecaborate)nickelate (III), and the like.

Specific examples of the carborane compounds include anionic salts, such as 4-carbanonaborane, 1,3-dicarbanonaborane, 6,9-dicarbadecaborane, dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane, 2,7-dicarbaundecaborane, undecahydrido-7,8-dimethyl-7,8-dicarbaundecaborane, dodecahydrido-11-methyl-2,7-dicarbaundecaborane, tri(n-butyl)ammonium 1-carbadecaborate, tri(n-butyl) ammonium-l-carbaundecaborate, tri(n-butyl)ammonium-l-carbadodecaborate, tri(n-butyl)ammonium-1-trimethylsilyl-1-carbadecaborate, tri(n-butyl)ammonium bromo-l-carbadodecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammonium dodecahydrido-8-methyl-7,9-dicarbaundecaborate, tri(n-butyl)ammonium undecahydrido-8-ethyl-7,9-dicarbaundecaborate, tri(n-butyl)ammonium undecahydrido-8-butyl-7,9-dicarbaundecaborate, tri(n-butyl)ammonium undecahydrido-8-allyl-7,9-dicarbaundecaborate, tri(n-butyl)ammonium undecahydrido-9-trimethylsilyl-7,8-dicarbaundecaborate, and tri(n-butyl)ammonium undecahydrido-4,6-dibromo-7-carbaundecaborate; and salts of metal carborane anion, such as tri(n-butyl)ammonium bis(nonahydrido-1,3-dicarbanonaborate)cobaltate (III), tri(n-butyl)ammonium bis(undecahydrido-7,8-dicarbaundecaborate)ferrate (III), tri(n-butyl)ammonium bis(undecahydrido-7,8-dicarbaundecaborate)cobaltate (III), tri(n-butyl)ammonium bis(undecahydrido-7,8-dicarbaundecaborate)nickelate (III), tri(n-butyl)ammonium bis(undecahydrido-7,8-dicarbaundecaborate)cuprate (III), tri(n-butyl) ammonium bis(undecahydrido-7,8-dicarbaundecaborate)aurate (III), tri(n-butyl)ammonium bis(nonahydrido-7,8-dimethyl-7,8-dicarbaundecaborate)ferrate (III), tri(n-butyl) ammonium bis(nonahydrido-7,8-dimethyl-7,8-dicarbaundecaborate)chromate (III), tri(n-butyl)ammonium bis(tribromooctahydrido-7,8-dicarbaundecaborate)cobaltate (III), tris[tri(n-butyl)ammonium]bis(undecahydrido-7-carbaundecaborate)chromate (III), bis[tri(n-butyl)ammonium]bis (undecahydrido-7-carbaundecaborate)manganate (IV), bis [tri(n-butyl)ammonium]bis(undecahydrido-7-carbaundecaborate)cobaltate (III), bis[tri(n-butyl)ammonium]bis(undecahydrido-7-carbaundecaborate)nickelate (IV), and the like.

The heteropolycompounds consist of an atom selected from silicon, phosphorus, titanium, germanium, arsenic, and tin, and one or more kinds of atoms selected from vanadium, niobium, molybdenum, and tungsten. Specifically, those which can be used include, but are not limited to, phosphovanadic acid, germanovanadic acid, arsenovanadic acid, phosphoniobic acid, germanoniobic acid, siliconomolybdic acid, phosphomolybdic acid, titanomolibdic acid, germanomolybdic acid arsenomolybic acid, tin molybdic acid, phosphotungstic acid, germanotungstic acid, tin tungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid, and salts of these acids, for example, salts with Group 1 or Group 2 metals, specifically, with lithium, sodium, potassium, rubidium, cesium, beryllium, magnesium, calcium, strontium, and barium, and organic salts such as triphenylethyl salt.

Among the ionized ionic compounds (b-3), the above ionic compounds are preferable, and especially triphenylcarbenium tetrakis(pentafluorophenyl)borate and N,N-dimethylanilinium tetrakis(pentafluorophenyl)borate are more preferable. The ionized ionic compounds (b-3) are used singly or in combination of two or more kinds.

In the invention, when a metallocene catalyst containing the metallocene compound (a) represented by the above general formula [A1], an organometallic compound (b-1) such as triisobutylaluminum, an organoaluminum oxycompound (b-2) such as methylaluminoxane, and an ionized ionic compound (b-3) such as triphenylcarbenium tetrakis (pentafluorophenyl) borate is used as a catalyst, it can exhibit very high polymerization activity in the production of the ethylene/α-olefin/non-conjugated polyene copolymer.

The metallocene catalyst used for the present invention can utilize the above metallocene compound (a) and at least one kind of compound (b) selected from the organometallic compound (b-1), the organoaluminum oxycompound (b-2), and the ionized ionic compound (b-3), and as necessary, it can also utilize a carrier (c).

((C) Carrier)

The carrier (c) used as necessary in the present invention (microparticulate carrier) is an inorganic or organic compound, which is a granular or microparticulate solid.

Examples of the inorganic compound are preferably porous oxides, inorganic halides, clays, clay minerals, or ion-exchangeable layered compounds.

Specific examples of the porous oxides which can be used include $SiO_2$, $Al_2O_3$, MgO, $ZrO$, $TiO_2$, $B_2O_3$, CaO, ZnO, BaO, $ThO_2$, and the like, or composites or mixtures containing any of them, for example, natural or synthesized zeolite, $SiO_2$—MgO, $SiO_2$—$Al_2O_3$, $SiO_2$—$TiO_2$, $SiO_2$—$Cr_2O_3$, $SiO_2$—$TiO_2$—MgO, and the like. Among them, those mainly composed of $SiO_2$ and/or $Al_2O_3$ are preferable. Although these porous oxides are different in nature depending on their kinds and production methods, the carrier preferably used in the present invention desirably has a particle diameter within the range of from 10 to 300 μm, preferably from 20 to 200 μm, a specific surface area within the range of from 50 to 1,000 m²/g, preferably 100 to 700 m²/g, and a pore volume within the range of from 0.3 to 3.0 cm³/g. Such a carrier is used, as necessary, after calcination at a temperature within the range of from 100 to 1,000° C., preferably from 150 to 700° C.

Examples of the inorganic halides to be used are $MgCl_2$, $MgBr_2$, $MnCl_2$, $MnBr_2$, and the like. The inorganic halides may be used as-is, or after trituration by ball milling or vibration milling. Alternatively, they can also be used in a microparticulate form which is obtained by precipitating, using a precipitating agent, inorganic halide dissolved into a solvent such as alcohol.

The clays to be used in the present invention are usually composed mainly of clay minerals. The ion-exchangeable layered compounds to be used in the present invention are compounds which have a structure in which planes formed by, for example, ionic bonds are piled in parallel on each other by a weak bonding force, and are compounds containing exchangeable ions. Most clay minerals are ion-exchangeable layered compounds. These clays, clay minerals, and ion-exchangeable layered compounds are not limited to natural materials, and synthesized ones can also be used.

The clays, clay minerals, and ion-exchangeable layered compounds can include clays, clay minerals, or ionic crystal compounds having a layered crystalline structure, such as the hexagonal close-packed structure, the antimony structure, the $CdCl_2$ structure, and the $CdI_2$ structure. Examples of the clays and clay minerals include kaolin, bentonite, kibushi clay, gairome clay, allophane, hisingerite, pyrophyllite, mica group, montmorilonite group, vermiculite, chlorite group, palygorskite, kaolinite, nakhlite, dickite, halloysite, and the like, and examples of the ion-exchangeable layered compound include crystalline acidic salts of multivalent metal, such as α-$Zr(HAsO_4)_2·H_2O$, α-$Zr(HPO_4)_2$, α-$Zr(KPO_4)_2·3H_2O$, α-Ti $(HPO_4)_2$, α-$Ti(HAsO_4)_2·H_2O$, α-Sn $(HPO_4)_2·H_2O$, γ-$Zr(HPO_4)_2$, γ-$Ti(HPO_4)_2$, γ-Ti $(NH_4 PO_4)_2·H_2O$, and the like.

Such clays and clay minerals, or ion-exchangeable layered compounds have a pore volume preferably of 0.1 cc/g or more, and particularly preferably of from 0.3 to 5 cc/g, as measured for pores of 20 Å or more in radius by using a mercury intrusion method. The pore volume is measured for pores of 20 to 30,000 Å in a radius by a mercury intrusion method using a mercury porosimeter.

When a carrier is used which has a pore volume of less than 0.1 cc/g as measured for pores of 20 A or more in radius, it tends to be difficult to yield high polymerization activity.

Clay and clay mineral used in the present invention are also preferably chemically treated. Any chemical treatment can be used such as a treatment for removing impurity attached to the surface of the materials and a treatment affecting the crystalline structure of the clay. Specific examples of the chemical treatment include acid treatments, basic treatments, treatments with salts, and treatments with organics. The acid treatments not only remove impurities on the surface of the materials, but also increase their surface area by eluting cations, such as Al, Fe, and Mg. The basic treatments destroy the crystalline structure of the clay, resulting in a change in its structure. The treatments with salts or organics can create ionic complexes, molecular composites, organic derivatives, and the like, to change the surface area or the interlayer distance of the materials.

Ion-exchangeable layered compounds to be used in the present invention may be those having an increased interlayer distance owing to the replacement of exchangeable ions between the layers with other bulkier ions by using their ion-exchangeability. Such bulky ions play a role of poles supporting the layered structure and are usually called "pillars." Inserting another substance between the layers of a layered compound is called "intercalation." Examples of the intercalated guest compound include cationic inorganic compounds such as $TiCl_4$ and $ZrCl_4$, metal alkoxides, such as $Ti(OR)_4$, $Zr(OR)_4$, $PO(OR)_3$, and $B(OR)_3$ (R is, for example, a hydrocarbon group), metal hydroxide ions, such as $[Al_{13}O_4(OH)_{24}]^{7+}$, $[Zr_4(OH)_{14}]^{2+}$, and $[Fe_3O(OCOCH_3)_6]^+$, and the like. These compounds are used singly or in combination of two or more kinds. These compounds can be intercalated in the presence of polymers obtained through hydrolysis of metal alkoxides, such as $Si(OR)_4$, $Al(OR)_3$, and $Ge(OR)_4$ (R is, for example, a hydrocarbon group), colloidal inorganic compounds such as $SiO_2$, and the like. Examples of the pillars include an oxide produced by thermal dehydration of the above intercalated metal hydroxide ion.

The clay, clay mineral, and ion-exchangeable layered compound to be used in the present invention can be used as-is or after treated by, for example, ball milling or sieving. They can also be used after fresh adsorption of water or thermal dehydration. Further, they can be used singly or in combination of two or more kinds.

Among them, preferable are clays or clay minerals, and particularly preferable are montmorilonite, vermiculite, hectorite, taeniolite, and synthesized mica.

Examples of the organic compound include granular or microparticulate solids ranging from 10 to 300 μm in particle diameter. Specifically, they can be exemplified by polymers or copolymers mainly composed of an α-olefin having 2 to 14 carbon atoms, such as ethylene, propylene, 1-butene, and 4-methyl-1-pentene, polymers or copolymers mainly composed of vinylcyclohexane or styrene, and modified products thereof.

The metallocene catalyst to be used in the present invention may contain the following specific organic compound component (d), as necessary, along with the metallocene compound (a), at least one kind of compound (b) selected from the organometallic compound (b-1), the organoaluminum oxycompound (b-2), and the ionized ionic compound (b-3), and the carrier (c) used as necessary.

((d) Organic Compound Component)

In the present invention, the organic compound component (d) is used, as necessary, in order to improve polymerization performance and physical properties of the produced polymer. Examples of such organic compound include, but are not limited to, alcohols, phenol compounds, carboxylic acids, phosphorus compounds, and sulfonate salts.

(Method for Producing Ethylene/α-Olefin/Non-Conjugated Polyene Copolymer)

The ethylene/α-olefin/non-conjugated polyene copolymer according to the present invention can be produced by copolymerizing monomers consisting of ethylene, α-olefin, and a non-conjugated polyene.

When such monomers are copolymerized, methods of how to use respective components composing the above polymerization catalyst and the order of adding the components are arbitrarily selected, and some exemplary methods are given below:

(1) A method in which the metallocene compound (a) alone is added to a polymerization vessel.

(2) A method in which the metallocene compound (a) and the compound (b) are added to a polymerization vessel in an arbitrary order.

(3) A method in which a catalyst component including the carrier (c) and the metallocene compound (a) supported on the carrier (c), and the compound (b) are added to a polymerization vessel in an arbitrary order.

(4) A method in which a catalyst component including the carrier (c) and the compound (b) supported on the carrier (c), and the metallocene compound (a) are added to a polymerization vessel in an arbitrary order.

(5) A method in which a catalyst component including the carrier (c) and metallocene compound (a) and the compound (b) both supported on the carrier (c) is added to a polymerization vessel.

In each of the above methods (2) to (5), at least two of the metallocene compound (a), the compound (b), and the carrier (c) may be contacted with each other in advance.

In each of the above methods (4) and (5) in which the compound (b) is supported, an additional compound (b) which is not supported may be added in an arbitrary order as necessary. In this case, the additional compound (b) may be the same as or different from the compound (b) supported on the carrier (c).

The solid catalyst component including the above carrier (c) and the metallocene compound (a) supported on the carrier (c) and the solid catalyst component including the carrier (c) and the metallocene compound (a) and the compound (b) both supported on the carrier (c) may be prepolymerized with olefin, and an additional catalyst component may be supported on the prepolymerized solid catalyst component.

In the present invention, the ethylene/α-olefin/non-conjugated polyene copolymer can be suitably obtained by copolymerizing monomers in the presence of the metallocene catalyst as described above.

When the olefin is polymerized by using the metallocene catalyst as described above, the metallocene compound (a) is used usually in an amount of from $10^{-12}$ to $10^{-2}$ mol, preferably from $10^{-10}$ to $10^{-8}$ mol per one liter of the reaction volume.

The compound (b-1) is used in an amount such that the molar ratio of the compound (b-1) to all atoms of the transition metal (M) in the metallocene compound (a), represented by [(b-1)/M], is usually within the range of from 0.01 to 50,000, preferably from 0.05 to 10,000.

The compound (b-2) is used in an amount such that the molar ratio of aluminum atoms of the compound (b-2) to all atoms of the transition metal (M) in the metallocene compound (a), represented by [(b-2)/M], is usually within the range of from 10 to 50,000, preferably from 20 to 10,000.

The compound (b-3) is used in an amount such that the molar ratio of the compound (b-3) to atoms of the transition metal (M) in the metallocene compound (a), represented by [(b-3)/M], is usually within the range of from 1 to 20, preferably from 1 to 15.

In the present invention, the ethylene/α-olefin/non-conjugated polyene copolymer can be produced in either liquid phase polymerization methods such as solution (dissolution) polymerization, suspension polymerization, or vapor phase polymerization methods, and the methods preferably include, but are not especially limited to, the following step of obtaining a polymerization-reaction solution.

The step of obtaining a polymerization-reaction solution is a step to obtain a polymerization-reaction solution of the ethylene/α-olefin/non-conjugated polyene copolymer by polymerizing monomers consisting of ethylene, an α-olefin, and a non-conjugated polyene by using an aliphatic hydrocarbon as a polymerization solvent, in the presence of a metallocene catalyst according to the present invention, preferably in the presence of the metallocene catalyst containing a transition metal compound wherein $R^{13}$ and $R^{14}$ bonding to $Y^1$ in the aforementioned general formula [A1] are phenyl groups, or phenyl groups substituted by an alkyl or halogen group, and $R^7$ and $R^{10}$ contain an alkyl substituent.

When the concentration of the ethylene/α-olefin/non-conjugated polyene copolymer in the polymerization solvent exceeds the above range, the viscosity of the polymerization solution is too high to be stirred uniformly, which may cause a difficulty in the polymerization reaction.

Examples of the polymerization solvent include aliphatic hydrocarbons and aromatic hydrocarbons. Specific examples thereof include aliphatic hydrocarbons, such as propane, butane, pentane, hexane, heptane, octane, decane, dodecane, and kerosene, alicyclic hydrocarbons, such as cyclopentane, cyclohexane, and methyl cyclopentane, aromatic hydrocarbons, such as benzene, toluene, and xylene, halogenated hydrocarbons, such as ethylene chloride, chlorobenzene, and dicloromethane, and they can be used singly or in combination of two or more kinds. In addition, olefins themselves can also be used as a solvent. Among them, hexane is preferable from the viewpoint of the separation and purification of the obtained ethylene/α-olefin/non-conjugated polyene copolymer.

Polymerization temperature is usually within the range of from −50 to +200° C., preferably from 0 to +200° C., more preferably from +80 to +200° C., and a higher temperature (+80° C. or more) is preferable from the viewpoint of catalyst activity, copolymerization ability, and productivity, although depending on a molecular weight to be achieved and the polymerization activity of a metallocene catalyst system to be used.

Polymerization pressure is generally within the range of from atmospheric pressure to 10 MPa gauge pressure, preferably from atmospheric pressure to 5 MPa gauge pressure, and polymerization reaction can be carried out by any one of batchwise, semi-continuous, and continuous methods. The polymerization can also be carried out in two or more steps under different reaction conditions. In the present invention, it is preferable to adopt, among them, a method of carrying out copolymerization by feeding monomers continuously into a reactor.

Reaction time (average residence time in the case that copolymerization is carried out continuously) varies depending on conditions such as catalyst concentration and polymerization temperature, but it is usually within the range of from 0.5 minutes to 5 hours, preferably 5 minutes to 3 hours.

The molecular weight of the obtained ethylene/α-olefin/non-conjugated polyene copolymer can also be controlled by adding hydrogen in the polymerization system or by changing the polymerization temperature. It can also be controlled by the amount of the compound (b) to be used. Specific examples of the compound include triisobutylaluminum, methylaluminoxane, and diethyl zinc. When hydrogen is added, its amount is suitably within the range of from about 0.001 to about 100 NL per 1 kg of olefin.

The charged molar ratio of ethylene to the above α-olefin, (ethylene/α-olefin), is preferably within the range of from 40/60 to 99.9/0.1, more preferably from 40/60 to 85/15, still more preferably from 55/45 to 85/15, and most preferably from 55/45 to 78/22.

The charged amount of the non-conjugated polyene is usually within the range of from 0.07 to 10% by mass, preferably from 0.1% by mass to 8.0% by mass, more preferably from 0.5% by mass to 5.0% by mass, with respect to 100% by mass of the sum of ethylene, α-olefin, and non-conjugated polyene (total amount of the total charged monomers in a case in which different monomers are used).

Rubber Containing Group 15 Elements

A rubber containing Group 15 elements used in the present invention is a rubber containing a structural unit having Group 15 elements.

Here, Group 15 elements refer to elements belonging to Group 15 (former VB group) in the periodic table and include nitrogen, phosphorus, arsenic, antimony, and bismuth. A Group 15 element in a typical embodiment of the present invention is nitrogen.

Typical examples of a rubber containing Group 15 elements used in the present invention include nitrile rubber, hydrogenated nitrile rubber, and urethane rubber. Nitrile rubber is a rubber containing structural units each having a nitrile group, for example, a rubber containing structural units derived from an unsaturated nitrile such as acrylonitrile or methacrylonitrile. Examples of nitrile rubber include acrylonitrile/butadiene rubber (NBR), acrylonitrile/butadiene/isoprene rubber (NBIR), and acrylonitrile/isoprene rubber (NBI). Of these, NBR, NBIR, and NBI are preferable in the present invention. Nitrile rubber is excellent in oil resistance. In general, as the nitrile content increases, the oil resistance improves, whereas when the nitrile content is low, the cold resistance tends to rise. In the present invention, the nitrile content in nitrile rubber is preferably in the range of from 15% by mass to 55% by mass from the viewpoint of the balance of physical properties.

Hydrogenated nitrile rubber is a rubber obtained by hydrogenating the nitrile rubber, and examples thereof include, for example, hydrogenated acrylonitrile/butadiene rubber (HNBR). Urethane rubber is a rubber having a urethane bond and can be obtained by reacting diisocyanate and polyol.

For example, in an automobile application, which is one of preferred embodiments of the present invention, nitrile rubber and hydrogenated nitrile rubber are preferably used as the rubber containing Group 15 elements, and nitrile rubber is the most typical example.

Adhesive Resin

An adhesive resin used in the present invention is not particularly limited as long as it is a resin capable of adhering the above-described olefin-type rubber and the rubber containing Group 15 elements. Examples of such an adhesive resin include an ethylene/vinyl acetate copolymer (EVA), a silane-modified ethylene/vinyl acetate copolymer (hereinafter referred to as "silane-modified EVA" in some cases), an ethylene/acrylic acid copolymer and an ionomer thereof, and an ethylene/methacrylic acid copolymer (EMMA) and an ionomer thereof. Of these, EVA, silane-modified EVA, and EMMA and an ionomer thereof are preferable. Here, in a preferred embodiment of the present invention, adhesive resins are EVA and silane-modified EVA. Regarding the reason why it is preferable to use these polymers, the present inventors presume as follows: when these polymers, especially EVA and silane-modified EVA, are used as adhesive resins, the rubber containing Group 15 elements, especially a rubber containing nitrile groups, is highly polar. In such a situation, adhesion is developed because of the interaction between these polymers and the nitrogen-containing groups contained in the rubber containing Group 15 elements and the twist of polymer chains constituting these polymers and polymer chains constituting the olefin-type rubber.

Here, the vinyl acetate content in EVA used in the present invention is preferably in the range of from 10% by mass to 50% by mass in order to obtain favorable adhesive strength. EVA preferably has a density in the range of from 930 kg/m$^3$ to 980 kg/m$^3$, and has a melt flow rate (MFR) at 190° C. under a load of 2.16 kg of from 0.8 g/10 minutes to 30 g/10 minutes. In the present invention, as an ethylene/vinyl acetate copolymer, one obtained by a conventionally known method can be appropriately used, or a commercially available product can also be adopted.

Here, a silane-modified EVA used in the present invention is obtained by graft-modifying EVA with a silane compound. Here, a silane compound that may be used in the present invention is an organosilicon compound having one or more unsaturated hydrocarbon groups and one or more alkoxy groups in its molecule. Examples of the unsaturated hydrocarbon group include, for example, a vinyl group, an allyl group, and a (meth)acryl group. Examples of the alkoxy group include, for example, a methoxy group, an ethoxy group, and a butoxy group. The silane compound is preferably, for example, vinyltrimethoxysilane or vinyltriethoxysilane in which the unsaturated hydrocarbon group is a vinyl group and the alkoxy group is a methoxy group or an ethoxy group. The amount of the silane compound to be added in the silane-modified EVA used in the present invention is preferably from 0.01 parts by mass to 5.0 parts by mass with respect to 100 parts by mass of EVA.

Here, the silane-modified EVA used in the present invention can be obtained by graft-modifying the EVA with the silane compound. For example, it can be obtained by adding a silane compound and a radical generator to EVA in an extruder, melt-kneading the resulting mixture at a temperature/time equal to or higher than the thermal decomposition starting temperature of the radical generator, and pelletizing the mixture. The radical generator is a compound which is decomposed by heating to generate free radicals and is used as a reaction initiator for chemically bonding a silane compound to EVA. As the radical generator, one having a half-life of 3 minutes or less at a temperature of not less than the melting point of EVA and not more than 150° C. is particularly preferable. Examples of the radical generator include, for example, peroxides such as benzoyl peroxide, lauroyl peroxide, t-butyl peracetate, t-butyl peroxy-2-ethyl hexanoate, t-butyl peroxy isobutylate, and dicumyl peroxide. The amount of the radical generator to be used varies depending on the type of EVA and the amount of the silane compound to be used, but if it is reduced, crosslinking reaction between EVA and the silane compound will not be sufficiently performed, and if it is increased, single cross-linking of EVA will be easily induced. Therefore, it is preferably from 0.01 to 5.0 parts by mass with respect to 100 parts by mass of EVA. In order to suppress polymerization between the silane compounds, a reaction inhibitor such as mercaptan may be added.

Commercially available products can be used as an ethylene/acrylic acid copolymer and an ionomer thereof, and an ethylene/methacrylic acid copolymer (EMMA) and an ionomer thereof as appropriate.

<Layer (A)>

A layer (A) constituting the laminate of the present invention is an olefin-type rubber layer, which is a layer containing the olefin-type rubber described above.

Here, the layer (A), although not precluded from consisting only of an olefin-type rubber, is usually a layer prepared using not only the olefin-type rubber but also other components as raw materials. The layer (A) is usually a layer prepared by using and crosslinking the olefin-type rubber. Examples of components other than the olefin-type rubber include, for example, an organic peroxide (X-1), carbon black (X-2), an anti-aging agent (X-3), a softening agent (X-4), a metal oxide (X-5), a crosslinking aid (X-6), and an additional component (X-7).

((X-1) Organic Peroxide)

As the organic peroxide (X-1), any organic peroxide that can act as a crosslinking agent for the olefin-type rubber can be suitably used.

Specific examples of the organic peroxide (X-1) include dicumyl peroxide, di-tert-butyl peroxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropylcarbonate, diacetyl peroxide, lauroyl peroxide, and tert-butylcumyl peroxide.

The organic peroxide (X-1) can be used singly or in combination of two or more kinds.

The organic peroxide (X-1) is used preferably in an amount of 0.1 to 5 parts by mass, preferably 0.5 to 5 parts by mass, and more preferably 0.5 to 4 parts by mass, with respect to 100 parts by mass of the olefin-type rubber. The compounded amount of the organic peroxide (X-1) within the above range is suitable because crosslinked shaped articles have little bloom on the surface thereof and the rubber shaped articles exhibit excellent crosslinking characteristics.

((X-2) Carbon Black)

Examples of the carbon black (X-2) include various carbon blacks such as SRF, GPF, FEF, MAF, HAF, ISAF, SAF, FT, and MT, and surface treated carbon blacks which are these carbon blacks surface-treated with an agent such as a silane coupling agent.

The compounded amount of the carbon black (X-2) may be 10 to 300 parts by mass, preferably 10 to 200 parts by mass, more preferably 10 to 100 parts by mass, with respect to 100 parts by mass of the olefin-type rubber. When the content of carbon black (X-2) is within the above range, it is preferable because it can provide a laminate having improved mechanical properties such as tensile strength and abrasion resistance and increase the hardness thereof without impairing other physical properties thereof.

((X-3) Anti-Aging Agent)

When an anti-aging agent (X-3) is contained, it can prolong the life-time of shaped article.

Anti-aging agents (X-3) which may be used are conventionally well-known anti-aging agents, for example, amine-based anti-aging agents, phenol-based anti-aging agents, and sulfur-based anti-aging agents.

Specific examples of the anti-aging agent (X-3) include aromatic-secondary-amine-based anti-aging agents such as phenylbutylamine, N,N-di-2-naphthyl-p-phenylenediamine, and 4,4'-bis (α, α-dimethylbenzyl)diphenylamine (also known as "4,4'-dicumyl-diphenylamine"), amine-based anti-aging agents such as 2,2,4-trimethyl-1,2-dihydroquinoline polymer, phenol-based anti-aging agents such as dibutylhydroxytoluene and tetrakis[methylene(3,5-di-t-butyl-4-hydroxy)hydrocinnamate]methane; thioether anti-aging agents such as bis[2-methyl-4-(3-n-alkylthiopropionyloxy)-5-t-butylphenyl]sulfide; dithiocarbamate-based anti-aging agents such as nickel dibutyldithiocarbamate; sulfur-based anti-aging agents such as zinc salts of 2-mercaptobenzoylimidazole and 2-mercaptobenzoimidazole, dilaurylthiodipropionate and distearylthiodipropionate, and the like.

These anti-aging agents (X-3) can be used singly or in combination of two or more kinds.

The compounded amount of the anti-aging agent (X-3) is within the range of 0.5 to 5.0 parts by mass, and preferably 0.5 to 4.5 parts by mass, more preferably 0.5 to 4.0 parts by mass, with respect to 100 parts by mass of the olefin-type rubber. When the compounded amount is within the above range, it is preferable because the laminate has excellent heat aging resistance.

((X-4) Softening Agent)

As the softening agent (X-4), agents known as components conventionally compounded in rubbers, such as softening agents and processing aids, can be widely used.

Specific examples of the agent include:
petroleum-based softening agents such as paraffin-based processed oils, naphthene-based processed oils, and aromatic processed oils;
softening materials based on synthesized oils;
cooligomer of ethylene and α-olefin;
paraffin wax;
liquid paraffin;
white oil;
petrolatum;
softening agents based on coal tar such as coal tar and coal tar pitch;
softening agents based on vegetable oils, such as castor oil, cotton oil, linseed oil, canola oil, coconut oil, palm oil, soya oil, groundnut oil, Japan wax, rosin, pine oil, dipentene, pine tar, and tall oil;
substitutes (factices), such as black substitute, white substitute, and candy substitute;
waxes, such as beeswax, carnauba wax, and lanolin;
fatty acids, fatty acid salts and esters, such as ricinoleic acid, palmitic acid, stearic acid, linoleic acid, lauric acid, myristic acid, barium stearate, calcium stearate, magnesium stearate, zinc stearate, and zinc laurate;
ester-based plasticizers, such as dioctyl phthalate, dioctyl adipate, and dioctyl sebacate;
coumarone-indene resin;
phenol-formaldehyde resin;
terpene-phenol resin;
polyterpene resin;
petroleum-based hydrocarbon resins, such as synthesized polyterpene resins, aromatic hydrocarbon resins, aliphatic hydrocarbon resins, aliphatic cyclic hydrocarbon resins, aliphatic/alicyclic petroleum resins, aliphatic/aromatic petroleum resins, hydrogenated modified alicyclic hydrocarbon resins, hydrogenated hydrocarbon resins, liquid polybutene, liquid polybutadiene, atactic polypropylene, and the like.

Among them, fatty acid, petroleum-based softening agents, phenol-formaldehyde resin, petroleum-based hydrocarbon resins are preferable, fatty acid, petroleum-based softening agents, and petroleum-based hydrocarbon resins are more preferable, and fatty acid and petroleum-based softening agents are particularly preferable.

Among the petroleum-based softening agents, preferable are petroleum-based processed oils, among which paraffin-based processed oils, naphthene-based processed oils, aromatic processed oils are more preferable, and paraffin-based processed oils are particularly preferable. Among the petroleum-based hydrocarbon resins, aliphatic cyclic hydrocarbon resins are preferable. Among these softening agents, paraffin-based processed oils are particularly preferable.

These softening agents can be used singly or in combination of two or more kinds.

The compounded amount of the softening agent (X-4) is not particularly limited, but it is usually less than 200 parts by mass, and is preferably from 0 to 100 parts by mass, more preferably from 0 to 80 parts by mass, still more preferably from 0 to 70 parts by mass, and particularly preferably from 0 to 60 parts by mass with respect to 100 parts by mass of the olefin-type rubber.

((X-5) Metal Oxide)

Metal oxides can be appropriately selected depending on applications of the laminate and can be used singly or in combination of two or more kinds. Specific examples of metal oxides include zinc flower (for example, META-Z102) (trade name: zinc oxide manufactured by Inoue Calcium Corporation or the like) and magnesium oxide. The compounded amount thereof is usually from 0.5 to 20 parts by mass, preferably from 0.5 to 15 parts by mass, more preferably from 0.5 to 10 parts by mass, still more preferably from 0.5 to 5 parts by mass with respect to 100 parts by mass of the olefin-type rubber.

((X-6) Crosslinking Aid)

Examples of the crosslinking aid (X-6) include: sulfur; quinonedioxime compounds such as p-quinonedioxime; polyfunctional monomers, such as (meth) acrylate compounds, such as trimethylolpropane triacrylate and polyethylene glycol dimethacrylate; allyl compounds such as diallyl phthalate and triallyl cyanurate; maleimide compounds such as m-phenylene bismaleimide; divinylbenzene, and the like. The crosslinking aid (X-6) may be used singly or in combination of two or more kinds.

The compounded amount of the crosslinking aid (X-6) is not particularly limited, but it is usually 0 to 4.0 parts by mass, and is preferably 0 to 3.5 parts by mass, more preferably 0 to 3.0 parts by mass, still more preferably 0.1 to 3.0 parts by mass, with respect to 100 parts by mass of the olefin-type rubber. It is also desirable that the compounded amount of the crosslinking aid (X-6) is preferably within the range of from 0.5 to 2 moles, more preferably approximately equimolar, with respect to 1 mole of the organic peroxide (X-1).

((X-7) Additional Component)

Examples of the additional component (X-7) include various additive components conventionally added to the rubber composition such as a filler, a foaming agent, an antioxidant, a processing aid, surfactants, and a weathering agent. A resin component other than the olefin-type rubber may be contained, as necessary.

Examples of the filler include inorganic fillers such as silica, activated calcium carbonate, light calcium carbonate, heavy calcium carbonate, fine powdered talc, talc, fine powder silicic acid, and clay. These fillers can be in an amount of from 0 to 300 parts by mass and preferably from about 0 to 200 parts by mass with respect to 100 parts by mass of the olefin-type rubber. When a filler is used, a laminate can be obtained which has improved mechanical properties, such as tensile strength, tear strength, and abrasion resistance, and increased hardness without impairing its other physical properties.

The resin composition according to the present invention preferably contains an antioxidant from the viewpoint of capability to prolong its material life. Examples of the antioxidant include:

stabilizing agents based on aromatic secondary amines, such as phenylnaphthylamine, 4,4'-($\alpha,\alpha$-dimethylbenzyl)diphenylamine, N,N'-di-2-naphthyl-p-phenylenediamine;

stabilizing agents based on phenol, such as 2,6-di-t-butyl-4-methylphenol, tetrakis-[methylene-3-(3',5'-di-t-butyl-4'-hydroxyphenyl)propionate]methane;

stabilizing agent based on thioether such as bis[2-methyl-4-(3-n-alkylthiopropionyloxy)-5-t-butylphenyl]sulfide;

stabilizing agent based on benzoimidazole such as 2-mercaptobenzoimidazole;

stabilizing agent based on dithiocarbamates such as nickel dibutyldithiocarbamate;

stabilizing agent based on quinoline such as a polymerized product of 2,2,4-trimethyl-1,2-dihydroquinoline, and the like. These may be used alone or in combination of two or more kinds.

The antioxidant can be used in an amount of, for example, 5 parts by mass or less, preferably 3 parts by mass or less, with respect to 100 parts by mass of the olefin-type rubber.

The olefin-type rubber also can appropriately contain, if necessary, various additives that can be compounded in known rubber compositions.

The olefin-type rubber may be mixed with a surfactant. Examples of the surfactant include amines, such as di-n-butylamine, dicyclohexylamine, monoethanolamine, triethanolamine, "Acting B" (manufactured by YOSHITOMI PHARMACEUTICAL INDUSTRIES, LTD.), "Acting SL" (manufactured by YOSHITOMI PHARMACEUTICAL INDUSTRIES, LTD.), polyethylene glycol, diethylene glycol, lecithin, triallyl trimellitate, and compounds of zinc aliphatic or aromatic carboxylate (example; "Struktol activator 73", "Struktol IB 531", and "Struktol FA 541", manufactured by Schill&Seilacher GmbH), "ZEONET ZP" (manufactured by ZEON CORPORATION), octadecyltrimethylammonium bromide, synthesized hydrotalcite, and special quaternary ammonium compounds (example; "LIPOQUAD 2HTF" (manufactured by Lion Specialty Chemicals Co., Ltd., dialkyl(C14-18) dimethylammonium chloride)), and the like. LIPOQUAD 2HTF is the most preferable surfactant.

When the olefin-type rubber is mixed with a surfactant, the compounded amount of the surfactant is, for example, about 0.2 to 10 parts by mass, preferably about 0.3 to 8 parts by mass, more preferably about 0.3 to 7 parts by mass, particularly preferably about 0.5 to 7 parts by mass, and most preferably about 1 to 6 parts by mass with respect to 100 parts by mass of the olefin-type rubber. The surfactant can be appropriately selected depending on its use, and it can be used singly or in combination of two or more kinds.

The olefin-type rubber may be mixed with a pseudo-gel inhibitor. Examples of the pseudo-gel inhibitor include, for example, "NHM-007" (manufactured by Mitsui Chemicals, Inc.).

When the olefin-type rubber is mixed with a pseudo-gel inhibitor, the compounded amount thereof is within the range of usually from 0.1 to 15 parts by mass, and preferably from 0.5 to 12 parts by mass, more preferably 1.0 to 10 parts by mass, with respect to 100 parts by mass of the olefin-type rubber.

The olefin-type rubber may be further mixed with an additional additive, as necessary. Examples of the additional additive include agents such as heat stabilizers, weathering stabilizers, antistatic agents, colorants, lubricants, and thickeners.

The olefin-type rubber may be mixed with an additional resin component other than the olefin-type rubber, as necessary. Examples of the additional resin component include, but are not particularly limited to, polyolefin resins.

The olefin-type rubber mixed with a polyolefin resin enables controlling the hardness of products from the composition and decreasing its compound viscosity at processing temperature, resulting in further improvement of its processability. It is also preferable because it can be treated as a thermoplastic elastomer, resulting in its easier handling property and more choices of kneading methodology.

The polyolefin resin is suitably used which has a number-average molecular weight, as measured by GPC, of 10,000 or more in terms of polystyrene standard.

Examples of the polyolefin resin include an α-olefin homopolymer and an α-olefin copolymer. Examples of the α-olefin homopolymer include polyethylene, polypropylene, and the like, and examples of the α-olefin copolymer include a copolymer of ethylene/α-olefin having 3 to 20 carbon atoms. Examples of the copolymer of ethylene/α-olefin having 3 to 20 carbon atoms include ethylene-propylene rubber (EPR), propylene-ethylene rubber (PER), ethylene-butene rubber (EBR), ethylene-octene rubber (EOR), and the like.

Among these polyolefin resins, polyethylene, ethylene/α-olefin copolymer, and polypropylene are preferable.

The polyolefin resins can be used singly or in combination of two or more kinds.

When a polyolefin resin is added to the olefin-type rubber, the content of the polyolefin resin is, for example, from 1 to 100 parts by mass, preferably from 5 to 80 parts by mass, and more preferably from 10 to 50 parts by mass or thereabouts with respect to 100 parts by mass of the olefin-type rubber.

In the above range, it is possible to control the hardness of a laminate and decrease its compound viscosity at processing temperature, resulting in further improvement of its processability. It is also preferable because laminate can be treated as a thermoplastic elastomer, resulting in its easier handling property and more choices of kneading methodology.

<Layer (B)>

A layer (B) constituting the laminate of the present invention is an adhesive resin layer, which is a layer made of the above-described adhesive resin.

The layer (B) may be prepared by using at least an adhesive resin, and the addition of additional components is not hindered unless adhesion is impaired. However, it is usually a layer prepared using only an adhesive resin.

<Layer (C)>

A layer (C) constituting the laminate of the present invention is a layer containing the above-described rubber containing Group 15 elements.

The layer (C) may be prepared using at least the rubber containing Group 15 elements, but is usually a layer prepared using not only the rubber containing Group 15 elements but also other components as raw materials. The layer (C) is usually a layer prepared by using the rubber containing Group 15 elements and crosslinking such a rubber. Examples of components other than the rubber containing Group 15 elements include, for example, sulfur (X-1'), and carbon black (X-2), an anti-aging agent (X-3), a softening agent (X-4), a metal oxide (X-5), a crosslinking aid (X-6), and an additional component (X-7) described in the explanation of the layer (A). The types and amounts of (X-2) to (X-7) can be the same as (X-2) to (X-7) described in the explanation of the layer (A).

((X-1') Sulfur)

As a crosslinking agent for forming the layer (C), use of the organic peroxide (X-1) described in the explanation of the layer (A) is not necessarily precluded. However, sulfur is rather preferably used as the crosslinking agent, particularly when nitrile rubber is used as the rubber containing Group 15 elements.

Sulfur (X-1') is used in an amount of desirably from 0.5 to 5.0 parts by mass with respect to 100 parts by mass of the rubber containing Group 15 elements. When the compounded amount of sulfur (X-1') is within the above range, favorable vulcanization properties can be obtained, which is preferable.

Here, when sulfur (X-1') is used as a crosslinking agent, as a crosslinking aid (X-6) are preferably used a guanidine-type vulcanization enhancer such as diphenyl guanidine, a thiuram-type vulcanization enhancer such as tetramethyl thiuram disulfide, a dithiocarbamate-type vulcanization enhancer, a thiazole-type vulcanization enhancer such as 2-mercaptobenzothiazole, and a sulfenamide-type vulcanization enhancer such as N-t-butyl-2-benzothiazole sulfenamide. When these vulcanization enhancers are used as the crosslinking aid (X-6), the crosslinking aid (X-6) is used in an amount of desirably from 0.5 to 5 parts by weight with respect to 100 parts by weight of the rubber containing Group 15 elements.

When the organic peroxide (X-1) described in the explanation of the layer (A) can be used as a crosslinking agent, the type and amount of the crosslinking aid (X-6) can be the same as those of the crosslinking aid (X-6) described in the explanation of the layer (A).

Meanwhile, the types and amounts of carbon black (X-2), an anti-aging agent (X-3), a softening agent (X-4), a metal oxide (X-5), and an additional component (X-7) can be the same as those of the carbon black (X-2), the anti-aging agent (X-3), the softening agent (X-4), the metal oxide (X-5), and the additional component (X-7) described in the explanation of the layer (A).

(Method of Preparing Materials Constituting Each Layer)

The method of preparing materials constituting each layer is not particularly limited. When only an olefin-type rubber is a material constituting the layer (A) or when only a rubber containing Group 15 elements is a material constituting the layer (C), each of the above-described rubbers can be used as is. Regarding the layer (B), the above-described adhesive resin can be used as is.

When materials constituting each layer contain components other than the above-described rubbers, in other words, when the layer (A) is made of a resin composition containing the olefin-type rubber and/or when the layer (C) is made of a resin composition containing the rubber containing Group 15 elements, such a layer can be prepared by the following method.

The resin composition can be prepared by appropriately blending components used to constitute each layer which are selected from the rubber (the olefin-type rubber (layer (A)), the rubber containing Group 15 elements (layer (C))), the organic peroxide (X-1) or the sulfur (X-1'), the carbon black (X-2), the anti-aging agent (X-3), the softening agent (X-4), the metal oxide (X-5), the crosslinking aid (X-6), and the additional component (X-7).

Methods of preparing the resin composition include, but are not particularly limited to, for example, methods, such as a method of mixing each component to be contained in the resin composition by using a conventionally known kneading machine such as a mixer, a kneader, and a roll, or even by using a continuous kneading machine such as a twin screw extruder, and a method of preparing a solution in which each component to be contained in the resin composition is dissolved or dispersed, followed by removing the solvent from the solution.

(Laminate)

As described above, the laminate of the present invention comprises a structure comprising, in order, the olefin-type rubber layer (A), the adhesive resin (B), and the layer (C) containing a rubber containing Group 15 elements.

The thickness of each layer constituting the laminate is not particularly limited. However, the thickness of layer (A) is usually from 0.1 mm to 10.0 mm, preferably from 0.5 mm to 5.0 mm, the thickness of layer (B) is usually 0.01 mm to 2.0 mm, preferably from 0.05 mm to 0.5 mm, and the thickness of layer (C) is usually from 0.1 mm to 10.0 mm, preferably 0.5 mm to 5.0 mm. The total thickness of the laminate is not particularly limited, but is usually from 1.0 mm to 20.0 mm, preferably from 2.0 mm to 10.0 mm.

Note that a laminate in which the layer (A) and the layer (C) are bonded via the layer (B) may have a layer structure of layer (A)/layer (B)/layer (C), and the layer structure of the laminate as a whole is not particularly limited.

(Method of Producing Laminate)

The method of producing a laminate of the present invention is not particularly limited. However, examples of the method include a method of obtaining a laminate by the following method (a). According to the method (a), a crosslinking step may be conducted after obtaining a laminate. Alternatively, it is also possible to obtain a laminate having a layer comprising a crosslinked rubber by conducting a secondary vulcanization step in, for example, an oven after primary vulcanization.

(a) Method of obtaining a laminate, in which a layer (A) and a layer (C) are adjacent to each other via a layer (B), the method comprising mixing materials constituting the layer (A) by using a kneader, a roll, or a mixer such as a Banbury mixer or an internal mixer and extruding the kneaded product by an extruder to form the layer (A), mixing materials constituting the layer (C) by using a kneader, a roll, or a mixer such as a Banbury mixer or an internal mixer and extruding the kneaded product by an extruder to form the layer (C), and bonding the layer (A) and the layer (C) via the layer (B).

When a laminate is produced, it is preferable to conduct press shaping of a laminate in which the layer (A) and the layer (C) are adjacent to each other via the layer (B) in view of the improvement of peel strength between the layer (A) the layer (C).

(Crosslinking Step or Primary Vulcanization)

A crosslinked step or primary vulcanization is a step of preliminarily adding components necessary for crosslinking such as a crosslinking agent to materials constituting the layer (A) and materials constituting the layer (C) and performing crosslinking by heating (for example, 150° C. to 240° C.), a step of irradiating a laminate with an electron beam (for example, an electron beam having an energy of 0.1 to 10 MeV) to perform crosslinking, or the like. Irradiation with the electron beam is carried out so that the dose absorbed into the laminate may be usually 0.5 to 36 Mrads, preferably 0.5 to 20 Mrads, and more preferably 1 to 10 Mrads.

When crosslinking is carried out by heating during the crosslinked step or primary vulcanization, it is preferable to carry out heating while conducting press-shaping in view of the improvement of peel strength between the layer (A) and the layer (C).

(Secondary Vulcanization)

Secondary vulcanization is a step carried out after the primary vulcanization for sufficiently improving vulcanization (crosslinking) by performing heating (for example, 150° C. to 200° C.).

<Application>

As the laminate of the present invention can satisfy various required characteristics because of its layer configuration, it can be used for various applications.

The laminate of the present invention can be used for various applications. The laminate of the present invention can be used for members of automobiles, motorbikes, industrial machinery, construction machinery, agricultural machinery, and the like. Specific examples of the members include rolls for industrial use, packings (for example, capacitor packing), gaskets, belts (for example, heat-insulating belt, belt for copying machines, and conveyance belt), hoses such as hoses for cars (for examples, turbocharger hose, water hose, brake reservoir hose, radiator hose, and air hose), anti-vibration rubbers, anti-vibration or vibration-controlling materials (for example, engine mount and motor mount), muffler hangers, cables (ignition cable, cabtire cable, and high tension cable), materials for wire cover (materials for covering high voltage wire, low voltage wire, and wire used in vessels), glass run channels, colored skin materials, paper-feeding rolls, and roofing sheets.

The olefin-type rubber such as an ethylene/α-olefin/non-conjugated polyene copolymer also enables obtaining a crosslinked article excellent not only in moldability and crosslinking property, but also in thermal stability, and therefore, the olefin-type rubber having a layer (A) can be suitably used in applications in which their long-term use under high temperature is expected. In a case in which the olefin-type rubber is an ethylene/α-olefin/VNB copolymer, it is particularly excellent in terms of fatigue resistance, which means that the laminate can be usable under extreme condition for a long period of time. This is preferable.

The laminate of the present invention is suitably used for automotive interior and exterior parts and applications requiring heat resistance among others. An example application of the laminate is a hose which includes the laminate of the present invention at least as a part thereof. Although the hose does not have any particular limitation in its use, it is preferably a hose used in any one of applications for automobiles, motorbikes, industrial machinery, construction machinery, and agricultural machinery.

The hose of the present invention may include the laminate of the present invention as at least a part thereof, and it may be a hose consisting of the laminate of the present invention.

EXAMPLES

Although the present invention will be described more specifically based on the following Examples, the invention is not limited thereto.

(Measurement and Evaluation Method)

In Production Examples, Examples, and Comparative Examples below, measurement and evaluation methods of respective characteristics are as follows.

(Composition of Ethylene/α-Olefin/Non-Conjugated Polyene Copolymer and B Value)

The mass fraction (% by mass) of each structural unit of the ethylene/α-olefin/non-conjugated polyene copolymer and the B value were determined from measurement values by using $^{13}$C-NMR. The measurement values were obtained by measuring the $^{13}$C-NMR spectrum of the copolymer by using a nuclear magnetic resonance apparatus, Model ECX400P (manufactured by JEOL Ltd.) at a measurement temperature of 120° C., in a measurement solvent of orthodicholorobenzene/deuterated benzene=4/1, with number of scans of 8,000.

(Iodine Value)

The iodine value of an ethylene/α-olefin/non-conjugated polyene copolymer was obtained by titration. Specifically, titration was carried out by the following method.

An ethylene/α-olefin/non-conjugated polyene copolymer in an amount of 0.5 g was dissolved in 60 ml of carbon tetrachloride, small amounts of a Wijs reagent and a 20% potassium iodide solution were added, and the resulting solution was titrated with a 0.1 mol/L sodium thiosulfate solution. In the vicinity of the end point, a starch indicator was added and the titration was performed while a resulting mixture was well-stirred until the disappearance of light purple color, and the g number of iodine was calculated as the amount of halogen consumed relative to 100 g of the sample.

(Intrinsic viscosity [η])

The intrinsic viscosity [η] (dl/g) of the ethylene/α-olefin/non-conjugated polyene copolymer was measured by using a fully automated intrinsic viscometer manufactured by RIGO CO., LTD., at a temperature of 135° C. in a measurement solvent of decalin.

(Weight-Average Molecular Weight (Mw), Number-Average Molecular Weight (Mn), and Molecular Weight Distribution (Mw/Mn))

The weight-average molecular weight (Mw), the number-average molecular weight (Mn), and the molecular weight distribution (Mw/Mn) are numerical values in terms of polystyrene, measured by gel permeation chromatography (GPC). The measuring apparatus and a measurement condition are as follows. The molecular weight was calculated based on the conversion method using a calibration curve generated by using commercial monodispersed polystyrene.

Apparatus: gel permeation chromatograph Model Alliance GP2000 (manufactured by Waters),
Analyzer: Empower2 (manufactured by Waters),
Column: TSKgel GMH6-HT×2+TSKgel GMH6-HTL×2 (7.5 mm I.D.×30 cm, manufactured by Tosoh Corporation),
Column temperature: 140° C.,
Mobile phase: o-dichlorobenzene (containing 0.025% of BHT),
Detector: refractive index detector (RI), Flow rate: 1.0 mL/min,
Load quantity: 400 μL,
Sampling interval: 1 s,
Column calibration: monodispersed polystyrene (manufactured by Tosoh Corporation),
Molecular-weight: expressed in terms of EPR in the old method/calibrating method taking viscosity into account.

(Complex viscosity η*)

By using a viscoelasticity measuring device Ares (manufactured by Rheometric Scientific, Inc.) as a rheometer, the complex viscosity η*(ω=0.01) at a frequency ω=0.01 rad/s, complex viscosity η*(ω=0.1) at a frequency ω=0.1 rad/s, complex viscosity η*(ω=10) at a frequency ω=10 rad/s, and complex viscosity η*(ω=100) at a frequency ω=100 rad/s (the unit is Pa·sec for each case) were measured under conditions of 190° C. and a strain of 1.0%. From the obtained results, the P value (η*(ω=0.1)/η*(ω=0.1)), which is a ratio (η*ratio) between the complex viscosity η*(ω=0.1) and the complex viscosity η*(ω=100), was calculated.

(Number of Long-Chain Branches Per 1000 Carbon Atoms ($LCB_{1000C}$))

Measurement was carried out by the methods described in the requirements (V-i) to (V-iii) above.

<Evaluation of Physical Properties of Unvulcanized Rubber>

(1) Mooney viscosity (ML (1+4) 100° C.)

The Mooney viscosity at 100° C. (ML (1+4) 100° C.) was measured at 100° C. using a Mooney viscometer (SMV 202 type manufactured by Shimadzu Corporation) in accordance with JIS K 6300.

(2) Vulcanization Induction Time

The induction time (TS1) was measured as described below with a vulcanization measurement device MDR 2000 (manufactured by ALPHA TECHNOLOGIES) under measurement conditions of a temperature of 160° C. and a time period of 30 minutes using uncrosslinked rubber compounds in the Examples and Comparative Examples.

The change in torque obtained under conditions of the constant temperature and the constant shear rate was measured. The time period, during which the torque increases by 1 point (1 dNm) from the minimum torque value, was determined to be the vulcanization induction time (TS1; minute).

(3) Vulcanization Rate

The vulcanization rate (TC90) was measured as described below with a measurement device MDR 2000 (manufactured by ALPHA TECHNOLOGIES) under measurement conditions of a temperature of 160° C. and a time period of 30 minutes using uncrosslinked rubber compositions in the Examples and Comparative Examples.

The change in torque obtained under conditions of the constant temperature and the constant shear rate was measured. The time period, during which the torque reaches a level of 90% of the difference between the maximum and minimum values of torque, was determined to be the vulcanization rate (TC90; minute).

(T-Peel Test)

Peel strength of the laminates was measured by the method described below.

T-peel test of the laminates obtained in the Examples and Comparative Examples was conducted for determining peel strength in compliance with JIS K6854-3: measurement temperature: 23.0° C.; test speed: 200.0 mm/min; and test piece width: 25.0 mm.

(Surface Swelling Test)

Surface swelling test of the laminates was conducted by the method described below.

The crosslinked rubber sheets (laminate) 5 mm in thickness obtained in the Examples and Comparative Examples were cut into 8 cm×8 cm square pieces, to give laminates for measurement.

A circular embankment was made using a silicone sealant on a layer B of each laminate for measurement. The embankment was formed on the layer B such that it had an inner diameter of 5 cm and a height of about 2 cm.

A lubricant (IRM903 manufactured by Japan Sun Oil Company, Ltd.) in an amount of 2.4 g was poured inside the embankment.

Temperature was maintained at 80° C. and the surface condition was observed 1 hour later.

Visual observation was conducted by evaluating a case in which the laminate surface appeared in the form of a protrusion due to swelling of the rubber of the laminate above the lubricant surface as "x" (swelling) and a case in which the laminate did not appear above the lubricant surface as "○" (no swelling).

(Modulus, Tensile Strength at Break, Tensile Elongation at Break)

Modulus, tensile strength at break, and tensile elongation at break of the sheets were measured by the methods described below.

Each sheet was punched out to give a dumbbell test piece of Type 3 described in JIS K 6251 (1993), which was used for a tensile test, to measure tensile stress (100% modulus (M100)) at a tension rate of 100%, tensile stress (200% modulus (M200)) at a tension rate of 200%, tensile stress (300% modulus (M300)) at a tension rate of 300%, tensile strength at break (TB), and tensile elongation at break (EB) under a condition of a measurement temperature of 25° C. and a tensile speed of 500 mm/minute according to the method specified in the section 3 of JIS K 6251.

(Hardness Test (Shore a Hardness))

According to JIS K 6253, sheet hardness (Type A durometer, HA) was measured by using a test piece of about 12 mm in thickness, which was made of six sheet-like rubber shaped articles of 2 mm in thickness having a smooth surface, the rubber shaped articles being stacked on the top of a flat portion of each other. A test piece which was contaminated by foreign substances, or which had foams or a scratch was not used. The dimension of the measurement surface of the test piece was taken to be large enough so that a pressure needle tip might enable measuring the hardness at a point distant by 12 mm or more from the edge of the test piece.

(Heat Aging Resistance Test)

A heat aging resistance test was carried out according to JIS K 6257. Specifically, each sheet was placed in an oven at 180° C. for 168 hours to be aged, and then a tensile test was carried out under a condition of a measurement temperature of 23° C., a tension rate of 500 mm/minute, to measure tensile strength at break (TB) and tensile elongation at break (EB). Further, hardness was measured by the same method as in the above-described section (Hardness test (Shore A hardness)).

(Flexural Fatigue Resistance)

In accordance with JIS K 6260, the resistance against crack generation of a test piece having no groove and the crack growth thereof were evaluated which were observed when repeated bending was given to the test piece by using a Demacha type bending tester. The measurement temperature was 23° C. and the number of cases in which the test piece was cut off was recorded.

Note that in a case in which the test piece was not cut off even after bending for 500,000 times, the test was terminated and the condition of the test piece was visually confirmed.

Production Example 1

(Production of Ethylene/Propylene/VNB Copolymer (A-1))

A continuous polymerization reaction of ethylene, propylene, and 5-vinyl-2-norbornene (VNB) was carried out at 87° C. by using a 300 L polymerization vessel equipped with a stirring blade.

The polymerization vessel was continuously fed with ethylene so that its feed rate might be continuously 3.6 kg/h, propylene 6.1 kg/h, VNB 290 g/h, and hydrogen 6.3 NL/h, with hexane as a polymerization solvent (feed rate: 32.6 L/h).

The polymerization vessel was continuously fed with di(p-tolyl)methylene(cyclopentadienyl) (octamethyloctahydrodibenzofluorenyl)zirconium dichloride as a main catalyst so that its feed rate might be 0.0015 mmol/h, with a polymerization pressure kept to be 1.6 MPaG and a polymerization temperature 87° C. Further, the polymerization vessel was continuously fed with $(C_6H_5)_3CB(C_6F_5)_4$ (CB-3) as a co-catalyst so that its feed rate might be 0.0075 mmol/h, and triisobutyl aluminum (TIBA) as an organoaluminum compound 20 mmol/h.

In this way, a solution was obtained which contained 15.2% by mass of ethylene/propylene/VNB copolymer formed from ethylene, propylene, and VNB. A small amount of methanol was added to the polymerization reaction solution extracted from the bottom of the polymerization vessel, to quench the polymerization reaction, and the ethylene/propylene/VNB copolymer was separated from the solvent by a steam stripping treatment, and then dried under reduced pressure at 80° C. for a whole day and night.

By the above operation, ethylene/propylene/VNB copolymer (A-1) formed from ethylene, propylene, and VNB was obtained at a rate of 4.7 kg/hr.

Physical properties of the obtained copolymer (A-1) were measured by the aforementioned methods. The results are listed in Table 1.

Hereinafter, the obtained copolymer (A-1) was also referred to as "VNB-EPT."

TABLE 1

| Copolymer | A-1 |
|---|---|
| Ethylene content [% by mass] | 57.7 |
| Ethylene/propylene [molar ratio] | 71/29 |
| VNB-IV [g/100 g] | 2.5 |
| VNB content [% by mass] | 1.2 |
| [η] [dl/g] | 2.7 |
| B value | 1.22 |
| Mw | 178000 |
| Mw/Mn | 2.65 |
| Mw × VNB content/100/VNB molecular weight | 17.8 |
| P value ($\eta^*_{(\omega=0.1)}/\eta^*_{(\omega=100)}$) | 29.1 |
| P/([η]$^{2.9}$) | 1.7 |
| VNB content × 6 | 7.2 |
| $LCB_{1000C}$ | 0.14 |
| 1 − 0.07 × Ln(Mw) | 0.15 |

Production Example 2A (Ethylene/Vinyl Acetate Copolymer)

EV 150 manufactured by Mitsui-DuPont Polychemicals Co., Ltd. (MFR (190° C., a load of 2.16 kg)=30 g/10 minutes, density=960 kg/m³, vinyl acetate content=33% by mass, melting point (DSC)=61° C.) was used as it was as an ethylene/vinyl acetate copolymer.

This ethylene/vinyl acetate copolymer was pressed at 160° C. for 4 minutes using a 50-ton press-shaping machine and then pressed at room temperature for 2 minutes to give a 15-cm square film having a thickness of 250 μm (hereinafter referred to as "EVA film").

Adhesion was evaluated using this film.

In the following description, the ethylene/vinyl acetate copolymer is referred to as "EVA."

Production Example 2B (Production of Silane-Modified Ethylene/Vinyl Acetate Copolymer)

A compound consisting of 100 parts by mass of an ethylene/vinyl acetate copolymer (EV260 manufactured by Mitsui-DuPont Polychemicals Co., Ltd.: MFR (190° C., a load of 2.16 kg)=6 g/10 minutes, density=950 kg/m³, vinyl acetate content=28% by mass, melting point (DSC)=72° C.), 1.7 parts by mass of vinyltrimethoxysilane as a silane compound, 0.15 parts by mass of dicumyl peroxide as a free radical generator, and 0.03 parts by mass of dodecyl mercaptan as a reaction inhibitor was supplied to a multiaxial extruder having a diameter of 65 mmϕ, melt-kneaded at a resin temperature of 200° C. or more, extruded, and cooled to form pellets, thereby obtaining a silane-modified ethylene/vinyl acetate copolymer.

This silane-modified ethylene/vinyl acetate copolymer was pressed at 160° C. for 4 minutes using a 50-ton press-shaping machine and then pressed at room temperature for 2 minutes, to give a 15-cm square film having a thickness of 50 μm (hereinafter referred to as "SMEVA film").

Adhesion was evaluated using this film.

In the following description, the obtained silane-modified ethylene/vinyl acetate copolymer is referred to as "SMEVA."

In the Examples and Comparative Examples, the following commercially available products were used as well as EVA and SMEVA described above.

(Ethylene/α-Olefin/Non-Conjugated Polyene Copolymer)

Mitsui EPT 2060M: ethylene/propylene/ENB copolymer with $ML(1+4)_{125}$° C. (ASTM D 1646) of 40, an ethylene content (ASTM D 3900) of 55 wt %, an ENB content (ASTM D 6047) of 2.3 wt % manufactured by Mitsui Chemicals, Inc.

Physical properties of Mitsui EPT 2060M are listed in Table 2.

Hereinafter, Mitsui EPT 2060M is also referred to as "ENB-EPT."

TABLE 2

| Copolymer | 2060M |
|---|---|
| Ethylene content [% by mass] | 55 |
| Ethylene/propylene [molar ratio] | 66/34 |
| ENB content [% by mass] | 2.3 |
| [η] [dl/g] | 2.16 |
| Mw | 161000 |
| Mw/Mn | 2.70 |
| B value | 1.00 |

(Nitrile Rubber)

Nipol 1042: Nitrile/butadiene rubber manufactured by Zeon Corporation

Nipol 1042 is also referred to as "NBR."

Example 1-1

(Preparation of Composition Containing VNB-EPT)

As a first step, 100 parts by mass of VNB-EPT was roughly kneaded for 30 seconds by a Banbury mixer, Model BB-2 (manufactured by KOBE STEEL, LTD.) Next, to the VNB-EPT were added 30 parts by mass of FEF carbon (Asahi #60G, manufactured by Asahi Carbon Co., Ltd.), 45 parts by mass of SRF carbon (Asahi #50G, manufactured by Asahi Carbon Co., Ltd.), 40 parts by mass of FT carbon (Asahi Thermal, manufactured by Asahi Carbon Co., Ltd.), 5 parts by mass of magnesium oxide (Kyowamag 150, manufactured by Kyowa Chemical Industry Co., Ltd.), 1 part by mass of stearic acid (Beads STEARIC ACID CAMELLIA, manufactured by NOF CORPORATION), 4 parts by mass of 4,4'-bis(α,α-dimethylbenzyl)diphenylamine (NOCRAC CD, manufactured by OUCHI SHINKO CHEMICAL INDUSTRIAL CO., LTD.), 47 parts by mass of process oil (Diana Process Oil PS 430, manufactured by Idemitsu Kosan Co., Ltd.), and 3 parts by mass of trimethylolpropane trimethacrylate (Hi-Cross M, manufactured by Seiko Chemical Co., Ltd.), and a resultant mixture was then kneaded at 140° C. for 2 minutes. Then, the ram of the mixer was raised to be cleaned, and the mixture was further kneaded for one more minute, and discharged at about 150° C. to yield a compound of the first step.

Next, as a second step, the compound obtained in the first step was banded on an roll of an 8-inch roll mill (manufactured by Nippon Roll MFG. Co., Ltd., operating with a front roll at a surface temperature of 50° C. and a rotational rate of 16 rpm and aback roll at a surface temperature of 50° C. and a rotational rate of 18 rpm), and 3 parts by mass of 2,5-dimethyl-2,5-di(t-butylperoxy)hexane (Perhexa 25B, manufactured by NOF CORPORATION) was added to the compound, which was then kneaded for 10 minutes to yield an uncrosslinked resin composition (rubber compound) (composition containing VNB-EPT).

(Preparation of Composition Containing NBR)

As a first step, 100 parts by mass of NBR was roughly kneaded for 30 seconds by a Banbury mixer, Model BB-2 (manufactured by KOBE STEEL, LTD.). Then, to the NBR were added 40 parts by mass of FEF carbon (Asahi #60G, manufactured by Asahi Carbon Co., Ltd.), 5 parts by mass of magnesium oxide (Kyowamag 150, manufactured by Kyowa Chemical Industry Co., Ltd.), 1 part by mass of stearic acid (Beads STEARIC ACID CAMELLIA, manufactured by NOF CORPORATION), 2 parts by mass of 2-mercaptobenzimidazole (NOCRAC MB manufactured by OUCHI SHINKO CHEMICAL INDUSTRIAL CO., LTD.), and 1 part by mass of pentaerythritol tetrakis{3-(3,5-di-tert-butyl-4-hydroxyphenyl)propionate} (1010, manufactured by BASF), and a resultant mixture was then kneaded at 140° C. for 2 minutes. Then, the ram of the mixer was raised to be cleaned, and the mixture was further kneaded for one more minute, and discharged at about 150° C. to yield a compound of the first step.

Next, as a second step, the compound obtained in the first step was banded on a roll of an 8-inch roll mill (manufactured by Nippon Roll MFG. Co., Ltd., operating with a front roll at a surface temperature of 50° C. and a rotational rate of 16 rpm and aback roll at a surface temperature of 50° C. and a rotational rate of 18 rpm), and 0.7 parts by mass of N-tert-butyl-2-benzothiazolylsulfenamide (NS: Ouchi Shinko Chemical Industrial Co., Ltd.) and 1.5 parts by mass of sulfur were added to the compound, which was then kneaded for 10 minutes to yield an uncrosslinked resin composition (rubber compound) (composition containing NBR).

(Preparation and Evaluation of Laminate)

(Preparation of Laminate for T-Peel Test)

The composition containing VNB-EPT and the composition containing NBR were each sheeted into a sheet-like shape. Next, 50 g of each of the unvulcanized rubber sheets (the sheets of the composition containing VNB-EPT and the composition containing NBR) was sandwiched between LUMIRRORs (stretched polyester (polyethylene terephthalate) films). Each unvulcanized rubber sheet sandwiched between LUMIRRORs was pressed at 120° C. for 2 minutes for the sheet of the composition containing VNB-EPT and at 80° C. for 2 minutes for the composition containing NBR using a 50-ton press-shaping machine, to give a unvulcanized rubber sheet, 20 cm in length and width (t (thickness)= 1 mm).

Next, the unvulcanized rubber sheet obtained from the composition containing VNB-EPT after the press (layer A), the EVA film (layer B), and the unvulcanized rubber sheet obtained from the composition containing NBR after the press (layer C) were each cut into the press size described below (length of 15 cm×width of 15 cm×thickness of 1 mm). After cutting, the upper-side and lower-side LUMIRRORs were removed, and then the unvulcanized rubber sheet (layer A), the EVA film (layer B), and the unvulcanized rubber sheet (layer C) were stacked in that order. They were stacked in a manner such that a Teflon (registered trademark) resin sheet (t=0.2 mm) was sandwiched between the unvulcanized rubber sheets at a certain part (width of 5 cm, length of 15 cm: margin for peel test).

The stacked unvulcanized rubber sheets sandwiching the Teflon (registered trademark) resin sheet at the certain part was pressed (main press) at 180° C. for 10 minutes using a 100-ton press-shaping machine, to give a crosslinked rubber sheet (laminate) of 2 mm in thickness.

The Teflon (registered trademark) resin sheet was removed from the resulting crosslinked rubber sheet (laminate), and T-peel test of the crosslinked rubber sheet (laminate) was conducted.

Example 1-2

Example 1-2 was carried out in the same manner as in Example 1-1 except that the SMEVA film was used instead of the EVA film.

Comparative Example 1

Comparative Example 1 was carried out in the same manner as in Example 1-1 except that the EVA film was not used.

Example 2-1

(Preparation of Composition Containing ENB-EPT)

As a first step, 100 parts by mass of ENB-EPT was roughly kneaded for 30 seconds by a Banbury mixer, Model BB-2 (manufactured by KOBE STEEL, LTD.). Then, to the ENB-EPT were added 80 parts by mass of FEF carbon (Asahi #60G, manufactured by Asahi Carbon Co., Ltd.), 5 parts by mass of magnesium oxide (Kyowamag 150, manufactured by Kyowa Chemical Industry Co., Ltd.), 1 part by mass of stearic acid (Beads STEARIC ACID CAMELLIA, manufactured by NOF CORPORATION), and 50 parts by mass of process oil (Diana Process Oil PS 430, manufactured by Idemitsu Kosan Co., Ltd.), and a resultant mixture was then kneaded at 140° C. for 2 minutes. Then, the ram of the mixer was raised to be cleaned, and the mixture was further kneaded for one more minute, and discharged at about 150° C. to yield a compound of the first step.

Next, as a second step, the compound obtained in the first step was banded on a roll of an 8-inch roll mill (manufactured by Nippon Roll MFG. Co., Ltd., operating with a front roll at a surface temperature of 50° C. and a rotational rate of 16 rpm and a back roll at a surface temperature of 50° C. and a rotational rate of 18 rpm), and master batch (DCP-40c manufactured by Kayaku Akzo Corporation) containing 40% by mass of dicumyl peroxide as 10.2 parts by mass of the organic peroxide component (4.1 parts by mass in terms of organic peroxide) was added to the compound, which was then kneaded for 10 minutes to yield an uncrosslinked resin composition (rubber compound) (composition containing ENB-EPT).

(Preparation of Composition Containing NBR and Preparation and Evaluation of Laminate)

Preparation of the composition containing NBR and preparation and evaluation of the laminate were carried out in the same manner as in Example 1-1 except that the composition containing ENB-EPT was used instead of the composition containing VNB-EPT.

Example 2-2

Example 2-2 was carried out in the same manner as in Example 2-1 except that the SMEVA film was used instead of the EVA film.

Comparative Example 2

Comparative Example 2 was carried out in the same manner as in Example 2-1 except that the EVA film was not used. Evaluation results in the Examples and Comparative Examples are listed in Table 3.

TABLE 3

| | Example 1-1 | Example 1-2 | Comparative Example 1 | Example 2-1 | Example 2-2 | Comparative Example 2 |
|---|---|---|---|---|---|---|
| Layer (A) | VNB-EPT | VNB-EPT | VNB-EPT | ENB-EPT | ENB-EPT | ENB-EPT |
| Layer (C) | NBR | NBR | NBR | NBR | NBR | NBR |
| Layer (B) | EVA | SMEVA | None | EVA | SMEVA | None |
| T-peel (N/cm) test | 13.7 | 8.6 | 0.5 | 5.5 | 10.0 | 0.5 |

The invention claimed is:

1. A laminate comprising a structure comprising, in order, an olefin-type rubber layer (A);
an adhesive resin layer (B) consisting of at least one selected from the group consisting of an ethylene/vinyl acetate copolymer, and a silane-modified ethylene/vinyl acetate copolymer; and
a layer (C) containing a rubber containing Group 15 elements;
wherein the laminate has a layer structure of layer (A)/layer (B)/layer (C),
wherein the adhesive resin layer (B) is in direct contact with the olefin-type rubber layer (A) and the layer (C),
wherein the olefin-type rubber layer (A) contains an ethylene/α-olefin/non-conjugated polyene copolymer having a weight-average molecular weight (Mw) within the range of from 10,000 to 600,000, and
wherein the ethylene/vinyl acetate copolymer has a density in the range of from 930 kg/m$^3$ to 980 kg/m$^3$, has a melt flow rate (MFR) at 190° C. under a load of 2.16 kg of from 0.8 g/10 minutes to 30 g/10 minutes, and has a vinyl acetate content of in the range of from 10% by mass to 50% by mass.

2. The laminate according to claim 1, wherein the layer (C) contains a rubber containing nitrogen atoms.

3. The laminate according to claim 1, wherein the layer (C) contains at least one selected from the group consisting of nitrile rubber, hydrogenated nitrile rubber, and urethane rubber.

4. The laminate according to claim 1, wherein the layer (C) contains nitrile rubber.

5. The laminate according to claim 1, wherein the ethylene/α-olefin/non-conjugated polyene copolymer has a structural unit derived from 5-vinyl-2-norbornene (VNB).

6. A hose comprising the laminate according to claim 1 as at least a part thereof.

7. The hose according to claim 6, which is used in any one of applications for an automobile, a motorcycle, industrial machinery, construction machinery, and agricultural machinery.

8. A method of producing the laminate according to claim 1, comprising a step of bonding the layer (A) and the layer (C) via the layer (B).

* * * * *